(12) United States Patent
Patterson

(10) Patent No.: US 10,140,303 B1
(45) Date of Patent: Nov. 27, 2018

(54) APPLICATION AWARE SNAPSHOTS

(71) Applicant: NexGen Storage, Inc., Louisville, CO (US)

(72) Inventor: John A. Patterson, Niwot, CO (US)

(73) Assignee: NexGen Storage, Inc., Louisville, CO (US)

( * ) Notice: Subject to any disclaimer, the term of this patent is extended or adjusted under 35 U.S.C. 154(b) by 508 days.

(21) Appl. No.: 14/833,532

(22) Filed: Aug. 24, 2015

Related U.S. Application Data

(60) Provisional application No. 62/040,777, filed on Aug. 22, 2014.

(51) Int. Cl.
*G06F 17/30* (2006.01)

(52) U.S. Cl.
CPC .... *G06F 17/30088* (2013.01); *G06F 17/3012* (2013.01)

(58) Field of Classification Search
CPC ................ G06F 17/30088; G06F 17/3012
See application file for complete search history.

(56) References Cited

U.S. PATENT DOCUMENTS

| | | | |
|---|---|---|---|
| 2008/0115071 A1 | 5/2008 | Fair | |
| 2008/0161885 A1* | 7/2008 | Hsu | ......................... G06F 3/061 607/60 |
| 2009/0300303 A1* | 12/2009 | Balasubramanian | ........................ G06F 3/0608 711/162 |
| 2009/0319585 A1 | 12/2009 | Gokhale | |
| 2010/0100529 A1 | 4/2010 | Erofeev | |
| 2012/0324183 A1* | 12/2012 | Chiruvolu | ........... G06F 11/2038 711/162 |
| 2013/0006926 A1 | 1/2013 | Erofeev | |
| 2013/0006938 A1 | 1/2013 | Prahlad et al. | |
| 2013/0054529 A1 | 2/2013 | Wang et al. | |

OTHER PUBLICATIONS

Commvault, Simpana Software Capabilities, pp. 1-6.
HP StoreVirtual Storage Application Aware Snapshot Manager Deployment Guide, Mar. 2013, pp. 1-12.
Microsoft, Volume Shadow Copy Service, pp. 1-10.
VMware, VMware KB: Understanding Virtual Machine Snapshots in VMware ESXi and ESX (1015180), pp. 1-5.

* cited by examiner

*Primary Examiner* — Grace Park
(74) *Attorney, Agent, or Firm* — Christopher J. Kulish

(57) ABSTRACT

Apparatuses, systems, methods, and computer program products are disclosed for creating an application-aware snapshot of a storage volume. A network association module is configured to determine an owner for a storage volume. A requester module is configured to request a snapshot operation for a storage volume. A snapshot operation may be initiated from a storage appliance. A provider module is configured to create a snapshot of data of a storage volume in a storage appliance in response to a determined owner quiescing activity for the storage volume.

33 Claims, 8 Drawing Sheets

APPLICATION AWARE SNAPSHOTS

CROSS-REFERENCE TO RELATED APPLICATIONS

This application claims the benefit of U.S. Provisional Patent Application No. 62/040,777 entitled "Application Aware Snapshots" and filed on Aug. 22, 2014, for John Patterson, which is incorporated herein by reference.

FIELD OF THE INVENTION

The present disclosure, in various embodiments, relates to data backup and more particularly relates to creating application-aware snapshots of storage volumes.

BACKGROUND OF THE INVENTION

Backing up data may refer to the process of copying and storing data to a backup location such that backed-up data may be used to restore the original data if the original data is lost or destroyed. When data is copied, the programs using the data may be in the middle of reading or writing data. Consequently, the copied data may be incomplete, requiring a complicated recovery phase where the programs replay changes made to the data from the time of copying. Alternatively, the data may simply be unrecoverable and lost. In such circumstances, data recovery, if possible, can be quite time-consuming and may require significant overhead.

SUMMARY OF THE INVENTION

Methods are presented for creating an application-aware snapshot. In one embodiment, a method includes discovering a volume of data. A method, in a further embodiment, includes identifying a manager associated with a discovered volume. A manager may comprise a manager type. In certain embodiments, a method includes copying data of a volume using an operation based on a manager type of an identified manager.

Apparatuses are presented to create an application-aware snapshot. In one embodiment, a network association module is configured to determine an owner for a storage volume. A requester module, in certain embodiments, is configured to initiate a snapshot operation for a storage volume in response to a snapshot request from a storage appliance. A provider module, in a further embodiment, is configured to create a snapshot of data of a storage volume in a storage appliance in response to a determined owner quiescing activity for the storage volume.

An apparatus, in one embodiment, includes a discovery module that determines an identifier for a server based on user input. A network association module, in certain embodiments, automatically correlates one or more storage volumes with a server based on an identifier. A network association module, in a further embodiment, presents one or more storage volumes to a user. A requester module, in one embodiment, schedules one or more snapshot operations for one or more storage volumes based on user input. A snapshot operation, in another embodiment, is adapted to a type of a server.

An apparatus, in another embodiment, includes means for associating a manager with a set of data. A manager, in certain embodiments, comprises a manager type of a plurality of supported manager types. An apparatus, in a further embodiment, includes means for creating a snapshot of a set of data based on a manager type of an associated host device in response to a request from a copy requester to a copy provider. In one embodiment, a method includes means for creating a remote copy of a snapshot of a set of data in response to a request from a copy requester to a copy provider.

Computer program products comprising a computer readable storage medium storing computer usable program code executable to perform operations for creating an application-aware snapshot are presented. In one embodiment, an operation includes detecting a plurality of stored file systems and each file system may be stored on a computer readable storage medium. An operation, in a further embodiment, includes correlating a system administrator with each stored file system. In certain embodiments, an operation includes quiescing at least one stored file system using a command of an identified system administrator. An operation, in another embodiment, includes creating backup data for at least one stored file system based on an identified system administrator in response to quiescing the at least one stored file system.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1A:
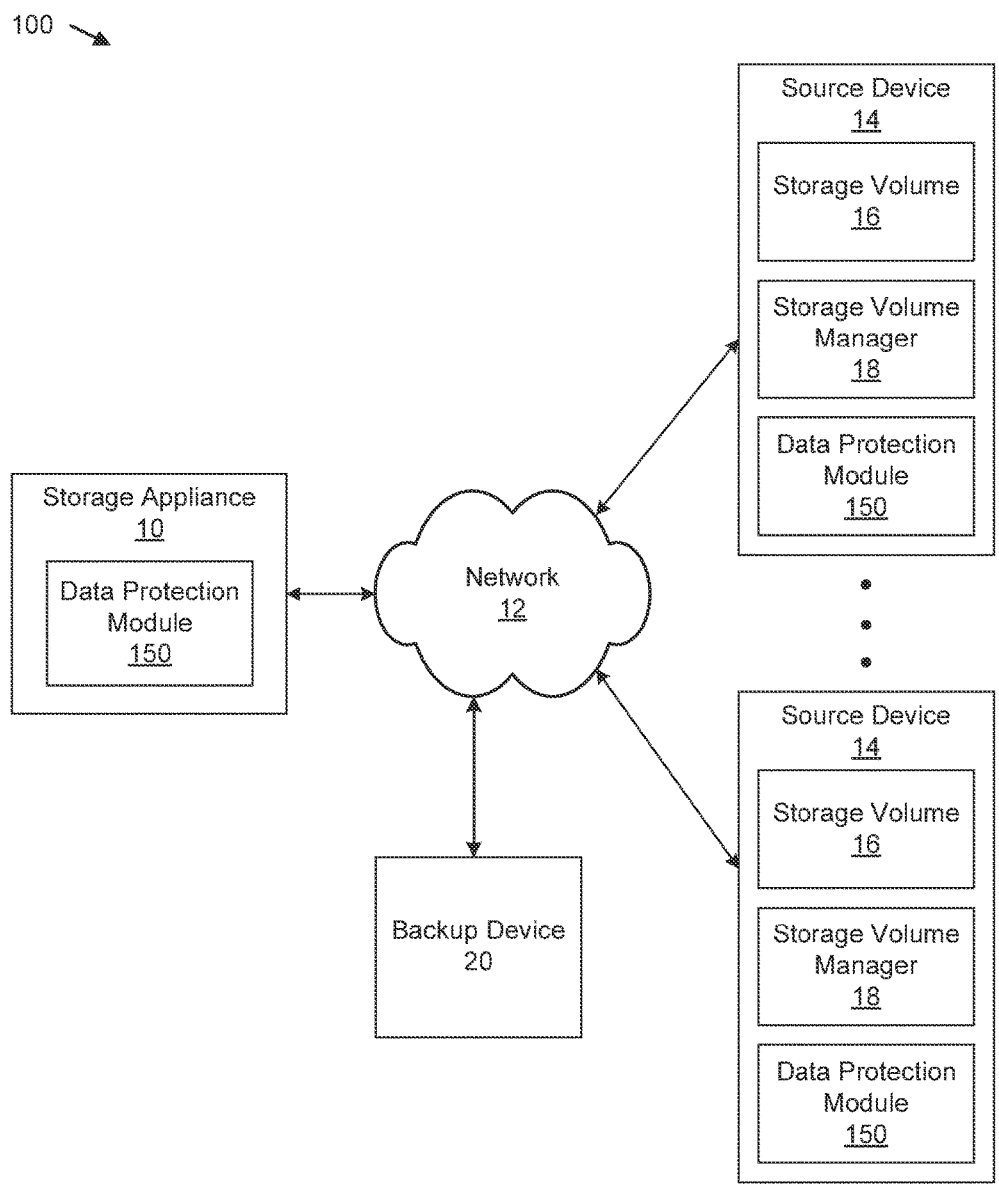
FIG. 1A is a schematic block diagram of one embodiment of a system comprising a data protection module.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1A depicts one embodiment of a system 100 for creating an application-aware snapshot. In the depicted embodiment, the system 100 includes a storage appliance 10, a network 12, a plurality of source devices 14, a backup device 20, and a data protection module 150, which are described in more detail below.

The storage appliance 10, in one embodiment, comprises a network storage appliance, a storage area network (SAN) storage appliance, network-attached storage (NAS), or the like. A storage appliance 10, as used herein, comprises a specialized computing device or another computing device configured to provide access to a data store over a network 12 or fabric 12, with or without a dedicated host device 14. In further embodiments, a storage appliance 10 may comprise a computing device, such as a desktop computer, a laptop computer, a hardware server, a virtual server, or the like. The storage appliance 10 further comprises non-transitory, computer-readable storage media. The computer readable storage media may comprise executable instructions configured to cause the storage appliance 10 to perform steps of one or more of the methods disclosed herein. Alternatively, or in addition, the data protection module 150 may be embodied as one or more computer readable and/or executable instructions stored on the non-transitory storage media of the storage appliance 10 and/or a source device 14, logic hardware of the storage appliance 10 and/or a source device 14, or the like.

The data network 12, in certain embodiments, comprises a digital communication network that transmits digital communications related to the system 100. The data network 12 may include a wired network, a storage fabric, a wireless network, such as a wireless cellular network, a local wireless network (e.g., a Wi-Fi network, a Bluetooth® network), or the like. The data network 12 may include a wide area network (WAN), a storage area network (SAN), a local area network (LAN), an optical fiber network, the Internet, or other digital communication network. The data network 12 may include two or more networks. The data network 12 may include one or more servers, routers, switches, and/or other networking equipment. The data network 12 may also include computer readable storage media, such as a hard disk drive, an optical drive, non-volatile memory, random access memory (RAM), or the like.

In one embodiment, each source device 14 comprises a computing device, such as a desktop computer, a laptop computer, a server, a virtual server, a smart phone, a tablet computer, a video game system, a set-top box, a smart television, or the like. Each source device 14, in the depicted embodiment, includes or is associated with one or more storage volumes 16 and an associated storage volume manager 18. A storage volume 16, in one embodiment, is a set of data stored on one or more computer-readable storage media, memory media, or the like. In certain embodiments, a storage volume 16 comprises a file system stored on one or more computer-readable storage media, memory media, or the like. While each storage volume 16 is depicted in association with a single source device 14, a storage volume may be a logical structure, with data of the storage volume 16 stored in a plurality of volatile and/or non-volatile locations (e.g., volatile memory media, non-volatile memory media, the storage appliance 10). A storage volume manager 18, in one embodiment, is an operating system, a hypervisor, a database management system (DBMS), an application, a server, or another manager or owner associated with a storage volume 16. A source device 14 may further comprise logic hardware and/or computer executable code implementing a storage volume manager 18, a data protection module 150, or the like.

Generally, snapshots are performed on a storage element that can be any of: (a) a volume, (b) a sub-volume of a volume, and (c) a group of storage elements. A group of storage elements can be any of: (a) two or more sub-volumes of the same volume, (b) two or more sub-volumes with at least one of the sub-volumes associated with a first volume and at least another sub-volume associated with a different, second volume, (c) a volume and a sub-volume of the same volume, (d) a volume and a sub-volume of a different volume, and (e) at least two different volumes.

The backup device 20, in one embodiment, comprises a computing device, such as a desktop computer, a laptop computer, a server, a virtual server, a mainframe, or the like. The backup device 20 may comprise a storage device, a storage appliance, a storage client executing on a device, or the like in communication with the storage appliance 10 over the data network 12. The backup device 20 may comprise a non-volatile memory device, a volatile memory, or the like for receiving data of a data transfer from the storage appliance 10. The backup device 20 may store a remote copy of data of the storage volume 16.

The system 100 comprises one or more data protection modules 150 to create snapshots or point in time copies of data, as a backup process, replication process, or the like for one or more storage volumes 16 or other data sets. A data protection module 150 may be located or installed on a storage appliance 10, on a source device 14, on a combination of both a storage appliance 10 and a source device 14, or the like. For example, in one embodiment, the data protection module 150 comprises one or more sub-modules on a storage appliance 10 and one or more sub-modules on a source device 14, separate data protection modules 150 on the storage appliance 10 and a source device 14, or the like.

The data protection module 150, in one embodiment, is configured to discover or detect one or more storage volumes 16 for snapshot or replication operations. In some embodiments, the data protection module 150 is configured to identify a manager 18 (e.g., a server, owner, operating system, hypervisor or other virtualization manager, DBMS, application, storage appliance 10, or other entity) associated with a discovered storage volume 16. The data protection module 150, in one embodiment, may support a plurality of different manager or server types (e.g., an operating system type, a virtualization server type, a storage appliance type, a database type) and may customize or adapt snapshot operations for data (e.g., a storage volume 16) based on a determined type for a manager, owner, and/or server associated with the data. In a further embodiment, the data protection module 150 is configured to initiate a data replication operation (e.g., a snapshot operation) for a storage volume 16 in response to a request from a storage appliance 10, allowing the storage appliance 10 and/or the data protection module 150 to initiate a snapshot or replication operation from the bottom up, instead of relying on a storage volume manager 18 to initiate the operation from the top down, or the like.

In one embodiment, the data protection module 150 is configured to copy data of the storage volume 16 using an operation based on the manger type. For example, if the associated manager 18 is an operating system, the data protection module 150 may copy data based on the type of operating system. Additionally, the data protection module 150 may create a remote copy of the data of the storage volume 16 and store the remote copy on the backup device 20. The data snapshot or replication operation, in one embodiment, may be based on or adapted to a manager or server type of the identified manager 18. Basing or adapting a snapshot or replication operation on a manager or server type, in certain embodiments, allows the resulting snapshot or point in time copy to be application consistent (e.g., recoverable and usable by an application, storage volume manager 18, or the like).

In certain embodiments, the data protection module 150 comprises and/or provides a user interface, allowing a user to manage, schedule, or otherwise configure snapshot operations. The data protection module 150 may receive an address, name, or other identifier for a server, owner, or other manager 18 for one or more storage volumes 16 from a user, may discover one or more storage volumes 16, may correlate or match one or more storage volumes 16 with an identified server, owner, or other manager 18, or the like. The data protection module 150 may receive user input assigning one or more storage volumes 16 to a protection group, defining a protection plan for a storage volume 16 and/or a protection group, or the like. In this manner, in certain embodiments, the data protection module 150 may simplify the scheduling and management of snapshots while cooperating with a server, owner, or other manager 18 to make the snapshots not only point in time consistent but application consistent. It should be appreciated that a protection group can comprise two or more storage elements.

In one embodiment, the data protection module 150 comprises executable software code, such as a device driver, or the like, stored on the computer readable storage media for execution on the processor. In another embodiment the data protection module 150 comprises logic hardware of one or more non-volatile memory devices, such as a non-volatile memory media controller, a non-volatile memory controller, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the data protection module 150 may include a combination of both executable software code and logic hardware.

Figure 1B:
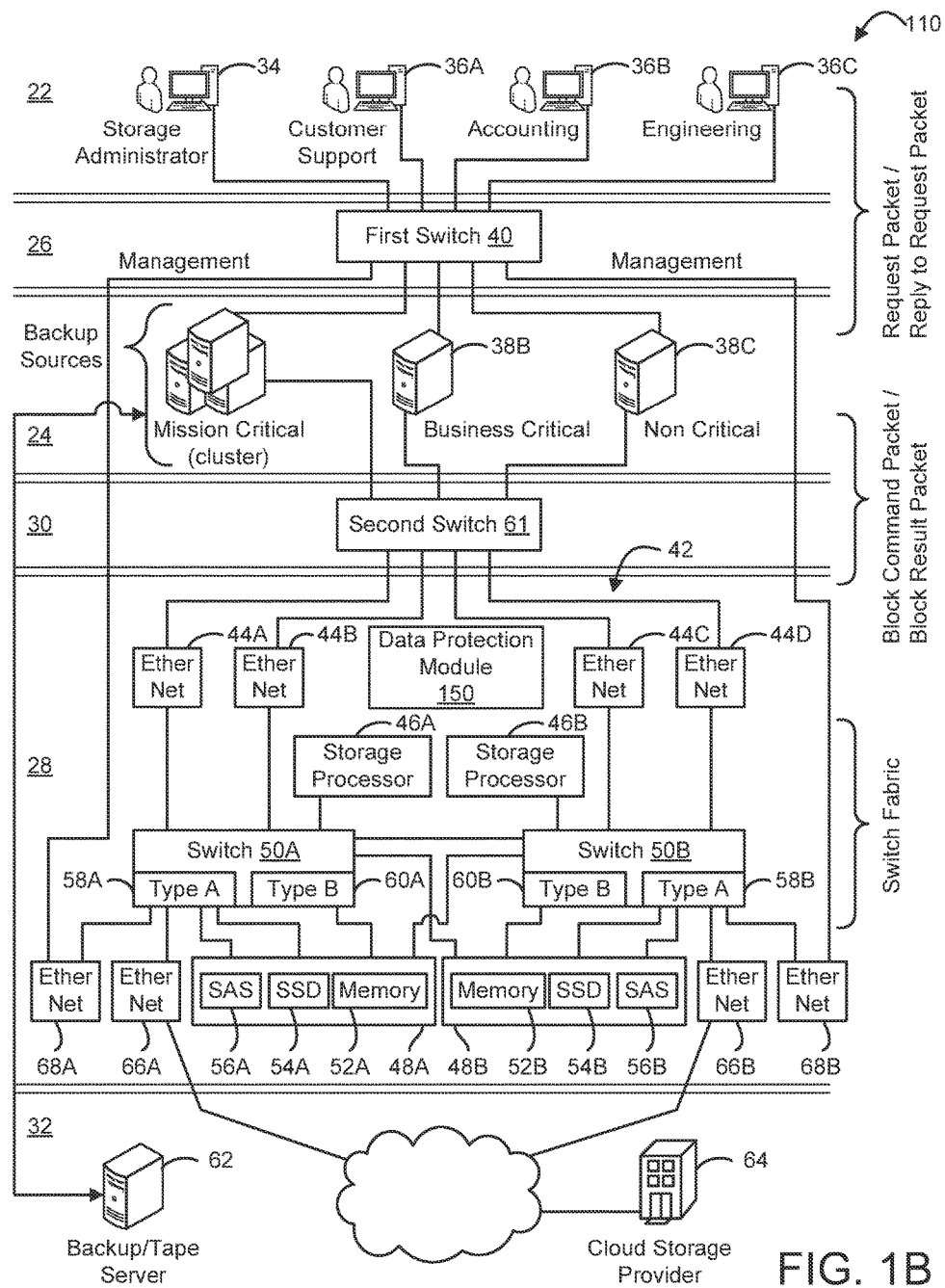
FIG. 1B is a schematic block diagram of another embodiment of a system comprising a data protection module.

FIG. 1B depicts one embodiment of another system 110 for archiving storage volume. The depicted embodiment includes an embodiment of a primary data storage system. The networked computer system, hereinafter referred to as system 110, includes a user level 22, an initiator level 24, a first switch level 26 that facilitates communication between the user level 22 and the initiator level 24, a primary data storage level 28, a second switch level 30 that facilitates communications between the initiator level 24 and the primary data storage level 28, and a secondary data storage level 32. In this regard, U.S. patent application Ser. No. 13/671,544, filed Nov. 7, 2012, and entitled "Primary Data Storage System with Quality of Service" is incorporated herein, in its entirety, by reference.

A journal in a primary data storage system 28, in one embodiment, is a sequenced list of data operations or storage commands (e.g., write commands, read commands, TRIM commands) that are executed in the order in which the operations were added to the list. In one embodiment, a journal or portion of a journal may be stored in a non-volatile memory medium such as a solid-state storage device 54 or hard disk drive 56. In a further embodiment, a journal or a portion of a journal may be stored in volatile memory 52. In another embodiment, a first portion of a journal may be stored in a non-volatile memory medium such as a solid-state storage device 54 or hard disk drive 56 and a second portion of the journal may be stored in volatile memory 52. In certain embodiments, a page or other portion of a journal may be dynamically paged or loaded from a solid-state storage device 54 into volatile memory 52, for servicing a read request or the like. A journal may comprise a sequential log, a circular log, an append-only log, a change log, a delta log, or other sequenced list. Recording storage commands in a journal, in certain embodiments, allows the storage commands and associated data to be recovered after a power failure, a system crash, or another restart event.

The present disclosure is directed to a primary data storage system 28 that includes a journaling processor that dynamically tunes a journal. As such, the journaling processor may assess whether or not to change the current order of operations in a journal. More specifically, this assessment may be based on whether reordering can produce a data space and/or time-speed benefit relative to a particular data store 48. For example, if the assessment reveals that a sequence of operations would require a first amount of time to perform on a particular data store 48 but that reordering the operations such that two operations that were separated from one another by one or more intervening operations now occurred in sequence would require a second amount of time that is less than the first amount of time, the journaling processor may reorder the operations. If there is no or little benefit in reordering the operations, the existing sequence of operations may be maintained.

In one embodiment, the primary data storage system 28 with dynamically tunable journaling is comprised of: (a) one or more i/o ports, each i/o port capable of receiving a packet with a block command and providing a packet with a reply, (b) a data store system having at least one data store 48 capable of receiving and storing data in response to a write block command and/or retrieving and providing data in response to a read block command, and (c) a storage processor 46 with a processor and application memory for executing computer code, the storage processor 46 including a journaling processor for executing computer code related to the sequencing of the processing of block related commands. More specifically, the journaling processor may receive a group of sequenced block commands, analyze the group of sequenced block commands to determine whether the sequence of block commands can be reordered to achieve a data space and/or time-speed benefit relative to the data store, produce a reordered group of block commands if the analysis indicates a data space and/or time-speed benefit can be attained, and add one of: (i) the reordered group of sequenced block commands and (ii) the group of sequenced block commands to a list of block commands to be executed relative to the data store 48. As should be appreciated, the original group of sequenced block commands is added to the list of block commands if the analysis did not reveal a meaningful space and/or time-speed benefit associated with reordering the group of sequenced block commands.

In another embodiment, the data store system 110 may comprise multiple data stores 48 and the journaling processor operates to analyze whether the reordering of block commands for each data store 48 can achieve a data space and/or time-speed benefit relative to the store 48. In another embodiment, the data store system 110 comprises multiple data stores 48 and the journaling processor operates to analyze whether the reordering of block commands for a subset of the multiple data stores 48 can achieve a data space and/or time-speed benefit for each of the data stores 48 in the subset.

For instance, in one embodiment, two commands in a group of commands may be separated from one another by several intervening commands, but these two commands may be executed in less time if the group of commands could be altered so that these two commands would be executed such that one command executes immediately after the other command. This could save time, for example, in reducing the number and/or extent of a seek operation required by a disk drive 56 to or from which data is to be transferred.

While the reordering of commands may provide a benefit, the reordering of commands in a group of commands may also produce different results from the results that would be obtained if the commands were executed in the original time sequence order. For instance, if a group of commands includes a write command that is followed by a read command and both commands relate to the same logical block of data, changing the order of the commands such that the read command precedes the write command would likely produce different results. To elaborate, if the commands are executed in the original time sequence order, the execution of the read command will result in the retrieval of the data that was written in executing the write command. In the reordered sequence, execution of the read command will retrieve whatever data was established in the logical block prior to the execution of the write command, which is likely to be different from the data that execution of the write command will establish in the logical block. As such, in certain embodiments, the primary data storage system 28 may provide the ability to reorder the commands in a group of commands to obtain a benefit associated with the reordering while also providing the ability to obtain the same results as if the commands were executed in the original order. In one embodiment, the ability to reorder a group of commands but obtain results as if the original order of the commands was retained is facilitated using a metadata structure. The extent of the metadata structure that is employed can vary based upon an analysis of the group of the commands potentially being reordered, or the like.

The user level 22 includes at least one user computer that is capable of being used in a manner that interacts with the primary data storage level 28. A user computer is capable of requesting that: (a) data associated with the user computer be sent to the primary data storage level 28 for storage and (b) data stored in the primary data storage level 28 be retrieved and provided to the user computer. At least one user computer associated with the user level is a storage administrator computer 34 that provides a storage administrator or system administrator with the ability to define the manner in which the data storage provided by the primary data storage level 28 is utilized. As illustrated in FIG. 1B, the user level 22 typically includes a plurality of user computers with at least one of the plurality of user computers being associated with a storage administrator and the other user computers being associated with other entities. For the purpose of illustration, the user level 22 includes user computers 36A-36C respectively associated with a customer support department, an accounting department, and an engineering department.

The initiator level 24 includes at least one initiator that operates to translate a request from a user computer into one or more block command packets. A request from a user computer is in the form of a request packet that conforms to a packet protocol such as transfer control protocol (TCP), Internet protocol (IP), Web, DB, and FileShare. A block command packet conforms to a block protocol that includes block commands for data storage devices that operate on one or more blocks of data. Examples of block protocols are the Internet Small Computer System Interface protocol (iSCSI), the Fiber Channel protocol (FC), TCP, and IP. Examples of block commands include: (a) a block write command that directs a data storage device to write one or more blocks of data to storage media associated with the device and (b) a block read command that directs a data storage device to read one or more blocks of data from a storage media associated with the device. A block of data is a fixed and predetermined number of contiguous bytes of data that is or will be resident on some kind of storage media. Typical block sizes are 512, 1024, 2048, and 4096 bytes. For example, a request from a user computer to read a large file of data resident at the primary data storage level 28 is likely to be translated by an initiator into multiple block command packets that each relate to one or more blocks of data that is/are part of the requested file.

The initiator also operates to translate a block result packet, a packet that is received by the initiator and provides the result or a portion of the result of the execution of a block command associated with a block command packet, into a reply to request packet. The initiator provides the reply to the request packet to the appropriate user computer.

As illustrated in FIG. 1B, the initiator level 24 commonly includes a plurality of initiators with each of the initiators capable of: (a) processing request packets from each of the user computers to generate block command packets and (b) processing block result packets to produce reply to request packets that are provided to the appropriate user computers. For the purpose of illustration, the initiator level includes initiators 38A-38C.

An initiator can be comprised of a cluster of two or more computers that each endeavors to process a request from a user computer and that provide redundancy in the event that one or more of the computers fail. Typically, an initiator that is designated to process high priority or critical requests is comprised of multiple computers, thereby providing redundancy should any one of the computers fail.

The first switch level 26 provides the ability for one or more user computers at the user level 22 to communicate with one or more initiators at the initiator level 24. More specifically, the first switch level 26 operates so as to receive a request packet from a user computer, process the request packet to determine which initiator should receive the request packet, and routes the request packet to the appropriate initiator. Conversely, the first switch level also operates to receive a reply to request packet from the initiator level 24, process the reply to request packet to determine which user computer should receive the reply to request packet, and routes the reply to request packet to the appropriate user computer.

The first switch level 26 can include a single switch that connects one or more user computers to one or more initiators or multiple switches that each connects one or more user computers to one or more initiators. For the purpose of illustration, the first switch level 26 includes a switch 40 that is capable of establishing communication paths between the user computers 34 and 36A-36C and the initiators 38A-38C.

In one embodiment, the source device 14 includes at least a portion of a primary data storage level 28. The primary data storage level 28 (or primary data storage system 28) operates to receive a block command packet from an initiator, attempt to execute the block command contained in the block command packet, produce a block result packet that contains the result of the attempted execution or execution of the block command, and provide the block result packet to the initiator that sent the related block command packet to the primary data storage system 28.

Typical block commands include a write command and a read command. In the case of a write command, the primary data storage system 28 attempts to write one or more blocks of data to a data store (sometimes referred to simply as a "store") associated with the primary data storage system 28. With respect to a read command, the primary data storage system 28 attempts to read one or more blocks of data from a data store associated with the primary data storage system 28 and provide the read data to the initiator.

The primary data storage system 28 includes at least one storage processor and at least one data store. The primary data storage system 28 also includes at least one switch when the at least one storage processor and the at least one data store associated with the at least one storage processor will accommodate two or more independent communication paths between the at least one storage processor and the at least one data store.

A storage processor includes an application memory and a processor for executing code resident in the application memory to process a block command packet. In one embodiment, the processor and the application memory are embodied in a SuperMicro Superserver 6036ST.

A data store is (a) a single data storage device or element or (b) a combination of data storage devices or elements. Examples of a single data storage element that can each be a data store include a CPU bus memory, a disk drive with a magnetic/optical disk, a solid state drive, and a tape drive with a tape. An example of a combination of data storage devices or elements that are configured to operate as a single data store is a group of disk drives configured as a Redundant Array of Independent Drives or RAID.

A data store can be characterized by the attributes of path redundancy, data redundancy, and persistence. The path redundancy attribute is a measure of the number of redundant and independent paths that are available for writing data to and/or reading data from a data store. As such, the value of the path redundancy attribute is the number of independent paths (e.g., the independent I/O ports associated with the data store) less one. The value of the path redundancy attribute is one or greater when there are at least two independent paths available for writing data to and/or reading data from the data store. If there is only one independent path available for writing data to and/or reading from a data store, the path redundancy is zero.

The data redundancy attribute is a measure of the number of failures of elements in a data store that can be tolerated without data loss. As such, the value of the data redundancy attribute is the number of elements in the data store less the number of elements that can fail before there is data loss. For example, if a data store is comprised of two disk drives (elements) with the data on one disk drive mirroring the data on the other disk drive, the value of the data redundancy attribute is one because the failure of one disk drive means that the data can still be recovered but the failure of both disk drives would mean that there would be data loss. As another example, the value of the data redundancy attribute of a RAID-6 data store comprised of six disk drives (elements) is two because the two of the disk drives (elements) can fail and the data can still be recovered but the failure of three or more disk drives (elements) would preclude the recovery of the data.

The persistence attribute is an indication of: (a) the presence of data on a data store for a substantial period of time without power being applied to the data store or (b) data remaining on a data store for a substantial period of time due to the presence of a primary power source and an independent backup power source that operates in the event of the failure of the primary power source. For example, if a data store is a single magnetic disk drive, the persistence attribute is "positive" because data will remain on the magnetic disk drive for a substantial period of time in the absence of power being applied to the drive. In contrast, a data store that is volatile memory without battery backup has a persistence attribute that is "negative" because data established in the memory will not remain in the memory in the absence of power being applied to the memory.

A data store also provides at least one of a number of possible combinations of read and write operations, including read-only, read and write, write-only, and write-once-read-many (WORM).

The switch facilitates communications between each of the storage processors or a subset of all of the storage processors associated with the primary data storage level 28 and each port of all of the data stores associated with the primary data storage system 28 or a subset thereof.

In certain embodiments, redundancy that allows the primary data storage system 28 to continue operation in the event of a predetermined level of failure of a storage processor, an element of a data store, and or a switch is desired. This redundancy refers to path redundancy in which there are at least two separate and independent paths extending at least part of the way between an I/O interface of the primary data storage system 28, the interface that initially receives a block command packet from an initiator and from which a block result packet is transmitted to an initiator, and a data store.

To provide one embodiment of path redundancy, the primary data storage system 28 includes: (a) an I/O interface 42 comprised of network cards 44A-44D, (b) first and second storage processors 46A, 46B, (c) first and second data store systems 48A, 48B, and (d) first and second switches 50A, 50B. It should be appreciated that storage processors 46A, 46B could each be a single processor or multiple processors operating cohesively.

The network cards 44A-44D (sometimes referred to as "Ethernet cards") of the I/O interface 42 are each addressable by one or more of whatever initiators are operative at the initiator level 24. In the illustrated embodiment, each of the network cards 44A-44D is an Ethernet card that is appropriate for use when all of the initiators that are active at the initiator level 24 are conducting communications with the primary data storage system 28 pursuant to the Ethernet protocol. Other cards can be employed if a different protocol, such as Fibre Channel, is used by the initiators.

The first and second data store systems 48A, 48B are each comprised of a portion of a data store, a portion of each of multiple data stores, a data store, multiple data stores, or combinations thereof.

The first and second switches 50A, 50B each provide at least a portion of the ability to connect (a) one or more of the network cards 44A-44D to a selected one of the storage processors 46A, 46B, (b) first and second storage processors 46A, 46B to one another, and (c) a selected one of the storage processors 46A, 46B to a selected one of the first and second data store systems 48A, 48B. The ability of switch 50A to establish a connection to a store in the data store system 48B depends on the store having at least one of two input/output ports available for establishing a connection with the switch. Similarly, the ability of switch 50B to establish a connection to a store in the data store system 48A depends on the store having one or at least two input/output ports available for establishing a connection with the switch.

The path redundancy that is provided by the embodiment of the primary data storage system 28 shown in FIG. 1B contemplates the failure of: (a) one or more but less than all of the Ethernet cards 44A-44D, (b) one of the first and second storage processors 46A, 46B, (c) one of the first and second switches 50A, 50B, and/or (d) a data store associated with one of the first and second data store systems 48A, 48B.

To elaborate, partial path redundancy is provided by rendering at least two of the network cards 44A-44D with the same initiator. If one of the at least two Ethernet cards fails, the other operative Ethernet card(s) provide(s) path redundancy for the initiator.

Partial path redundancy is provided by the two storage processors 46A, 46B. If one of the first and second storage processors 46A, 46B fails, the other storage processor can be utilized to provide the path redundancy between the I/O interface 42 and a data store. In this regard, the non-failing storage processor may use one or both of the switches 50A, 50B. For example, if the storage processor 46A is exclusively responsible for communications conducted over Ethernet card 44A, storage processor 46A needs to process a command propagated over Ethernet card 44A and associated exclusively with the first data store system 48A, and storage processor 46A fails, the storage processor 46B can utilize both the first and second switches 50A, 50B to complete a communication path between the Ethernet card 44A and the first data store system 48A, e.g., the storage processor 46B utilizes the first and second switches 50A, 50B to communicate with both the Ethernet card 44A and the first data store system 48A.

Partial path redundancy is provided by the first and second switches 50A, 50B. If one of the first and second switches 50A, 50B fails, the other switch can be utilized to provide the necessary path redundancy. This path redundancy is dependent upon the non-failing switch having: (a) access to a portion of the data store that provides data redundancy relative to the portion of the data store that is no longer accessible due to the failure of the other switch and (b) access to an Ethernet card that can be addressed by the same initiator as the Ethernet card(s) that is/are no longer available due to the failure of the other switch. For example, if Ethernet cards 44A and 44C are each addressable by the same initiator, the data store systems 48A and 48B each include an element that together define a data store in which one element mirrors the other element, and switch 50A fails, the switch 50B can be utilized to establish the necessary communication between the Ethernet card 44C and the element in data store system 48B.

Additionally, in many situations, multiple data stores that have different storage characteristics (e.g., speed, capacity, redundancy, and/or reliability) are desired. In this regard, the first data store system 48A is comprised of: (a) a first data store that is a first CPU bus memory 52A (sometimes referred to as memory store 52A) and is relatively fast but with relatively low capacity and no redundancy, (b) a second data store that is a first solid state disk or drive (SSD) 54A with less speed but greater capacity relative to the first CPU bus memory 52A and no redundancy, and (c) a third data store in the form of a first RAID disk array 56A with less speed and greater capacity than the first solid state disk 54A and redundancy. CPU bus memory is memory that is accessible to a processor of a storage processor via the processor's address bus, available for use by the processor, useable by the processor in processing a block command packet, and does not contain any portion of the application program that is executed or could be executed in the processing of a block command packet. In contrast, the processor accesses the first SSD 54A and the first RAID disk array 56A via an expansion bus (e.g., PCIe). Relatedly, stores having similar characteristics are typically configured within a primary data storage system so as to constitute a tier.

It should be appreciated that the first data store system 48A can be comprised of other combinations of partial data stores and/or data stores. For instance, the first data store system 48A could include a first disk drive and the second data store system 48B could include a second disk drive, the first and second disk drives together forming a data store in which the first and second disk drives mirror one another to provide data redundancy. In the illustrated embodiment, the second data store system 48B includes data stores in the forms of a second CPU bus memory 52B (sometimes referred to as memory store 52B), a second SSD 54B, a second RAID disk array 56B. It should be appreciated that the second data store system 48B can also include other combinations of data stores and partial data stores.

In a data store system that includes CPU bus memory and non-CPU bus data storage, the switch that is used to establish connections between the processor of a storage processor and the data store system is comprised of a type A switch that establishes connections with the non-CPU bus data storage and a type B switch that establishes connections with the CPU bus memory.

Because the first and second data store systems 48A, 48B respectively include CPU bus memories 52A, 52B, the first and second switches 50A, 50B respectively include type B switches 60A, 60B that respectively allow the processors of the storage processors 46A, 46B to establish communication paths with the CPU bus memories 52A, 52B. A type B switch is comprised of the hardware, software, and/or firmware associated with a storage processor that allow the processor to access the memory locations on the CPU memory bus associated with the CPU bus memory.

Further, because the first and second data store systems 48A, 48B respectively include non-CPU bus data storage in the form of SSD and SAS devices, the first and second switches 50A, 50B respectively include type A switches 58A, 58B that respectively allow the processors of the storage processors 46A, 46B to establish communication paths with the non-CPU bus data stores. A type A switch is comprised of the hardware, software, and/or firmware associated with an expansion bus that allows the processor to access the data on the non-CPU bus data storages. In certain embodiments, a storage appliance 10 (e.g., a network storage appliance, a storage area network (SAN) storage appliance, network-attached storage (NAS), or the like) comprises a primary data storage system 28, one or more data stores 48, or a component of a data store, or the like. A storage appliance 10, as used herein, comprises a specialized computing device configured to provide access to a data store 48 over a network 12 or fabric 12, with or without a dedicated host device 14.

The second switch level 30 provides the ability for each of the initiators associated with the initiator level 24 to communicate with at least one network card associated with the primary data storage system 28, the at least one network card being associated with at least one storage processor of the primary data storage system 28. More specifically, the second switch level 30 operates to receive a block command packet from an initiator and process the block command packet so as to route the packet to the address that is associated with a particular network card. Conversely, the second switch level 30 also operates to receive a block result packet from the primary data storage system 28 and process the block result packet so as to route the packet to the appropriate initiator.

The second switch level 30 can include a single switch that selectively connects one or more initiators to one or more network cards or multiple switches that each selectively connects one or more initiators to one or more network cards. For the purpose of illustration, the second switch level 30 includes switch 61 that is capable of selectively establishing a communication path between each of the initiators 38A-38C and each of the network cards 44A-44D.

The secondary data storage level 32 provides secondary storage of data, e.g., storage that is not constantly available for use by one or more user computers when the system 110 is in a normal/acceptable operating mode. In contrast, primary data storage is substantially constantly available for use by one or more user computers when the system 110 is in a normal/acceptable operating mode. The secondary data storage level 32 can include many different types of data storage, including tape drives, robotic data storage systems that employ robots to move storage media between players/recorders and storage locations, "cloud" storage, or the like. It should be appreciated that these types of data storage and other types of data storage that are largely used as secondary data storage can, in appropriate circumstances, become primary storage.

The secondary data storage level 32 includes a backup device 20 that may be in communication with one or more of the initiators at the initiator level 24 in response to a request packet issued by a user computer at the user level 22. In another embodiment, the source device 14 may be in direct communication with the storage appliance 10, 28, 48 and/or the backup device 20. For example, the secondary data storage level 32 may include a storage appliance 10, 28, 48 and a backup device 20 that includes a cloud storage provider that is accessible to the primary data storage system 28 via the network 12. The cloud storage provider can be a part of a data store, part of multiple data stores, a data store, multiple data stores, or combinations thereof that is respectively accessible to the storage processors 46A, 46B via network cards 66A, 66B (which are Ethernet cards in the illustrated embodiment) and the type A switches 58A, 58B respectively associated with switches 50A, 50B.

As discussed above with reference to FIG. 1A, the data protection module 150, in one embodiment, is configured to discover a non-volatile storage volume 16 or storage element. The non-volatile storage volume 16 may be a logical or physical storage partition or other data set associated with one or more of a solid-state storage device 54, a hard disk drive 56, a volatile memory, or the like. In some embodiments, the data protection module 150 is configured to identify a manager 18 associated with the discovered storage volume 16. In a further embodiment, the data protection module 150 is configured to perform a data replication operation, a snapshot operation, or the like for the storage volume 16 in response to a request from a storage appliance 10, 48 or another trigger. The data protection module 150, in one embodiment, may create a remote copy of the replicated data (e.g., snapshot) of the storage volume 16. In certain embodiments, the data protection module 150 stores the remote copy on a backup device 20. The data protection module 150 may provide a user interface allowing a user to configure and/or manage snapshot operations for storage volumes 16.

The system administrator computer 34 communicates with the primary data storage system 28 and, more specifically, the storage processor(s) in the primary data storage system 28 to define the manner in which the data storage provided by the primary data storage system 28 can be utilized. The communication path between the system administrator computer 34 and a storage processor in the primary data storage system 28 is from the system administrator computer 34 to the switch 40 and from the switch 40 to a network card. The network card and the storage processor can be connected to one another via the switch in the primary data storage system 28 that services the network cards associated with the initiators.

In the illustrated embodiment, the system administrator computer 34 respectively communicates with the storage processors 46A, 46B via network cards 68A, 68B and switches 50A, 50B. It should be appreciated that the administrator computer 34 can also communicate with the storage processors 46A, 46B via one or more paths that include the first switch level 26, the initiator level 24, and the second switch level 30.

Figure 2:
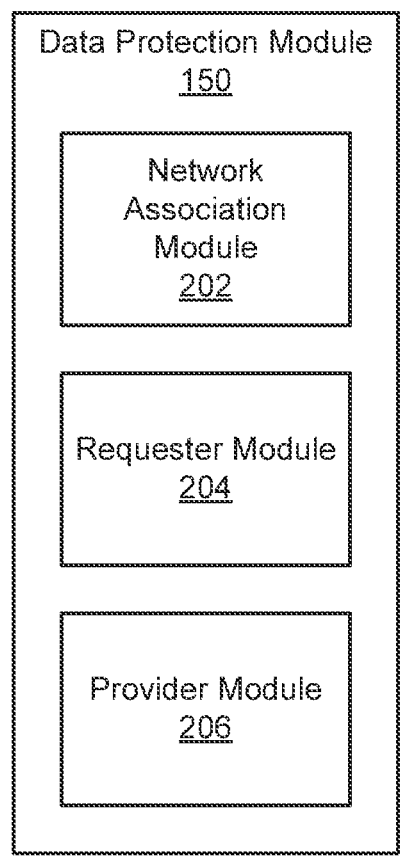
FIG. 2 is a schematic block diagram illustrating one embodiment of a data protection module.

FIG. 2 depicts one embodiment of a data protection module 150 for creating an application-aware snapshot. The data protection module 150 may be substantially similar to the data protection module 150 described above with regard to FIGS. 1A and 1B. In general, as described above, the data protection module 150, in one embodiment, is configured to identify a data replication service provider (e.g., a manager 18) for a storage volume 16 and to copy data of the storage volume 16 (e.g., create a snapshot or point in time copy) using an operation based on the data replication service provider. In the depicted embodiment, the data protection module 150 includes a network association module 202, a requester module 204, and a provider module 206, which are described in more detail below.

The network association module 202, in one embodiment, is configured to determine and/or discover one or more storage volumes 16. The network association module 202 may correlate or match storage volumes 16 with an owner, server, manager 18, snapshot service provider, or the like. As described in greater detail below with regard to the discovery module 308, in certain embodiments, a user may provide an address, name, or other identifier for an owner, server, or other manger 18. The network association module 202 may discover one or more storage volumes 16 and correlate or match the storage volumes 16 with an owner, server, or other manager 18 identified by a user. In other embodiments, the network association module 202 may be configured to discover or determine an address, name, or other identifier for an owner, server, snapshot service provider, or other manager 18 with little or no user input. For example, the network association module 202 may query one or more devices or other entities on the network 12, may scan or analyze a configuration file or list, or otherwise detect or discover one or more owners, servers, snapshot service providers, or other managers 18 for correlating or matching with storage volumes 16. By correlating or matching storage volumes 16 or other data sets with their associated owners, servers, or managers 18, snapshots of the storage volumes 16 may be customized to be made application consistent based on the determined association.

As used herein, a snapshot comprises a copy or record of the state of a system (e.g., a source device 14, a data store 48, a storage volume 16, a non-volatile storage device 54, 56, a file system, a database, a virtual machine, a storage element, or the like, or the combination of two of more of these items) at a particular point in time (e.g., a point in time copy). In some embodiments, a snapshot may comprise a point in time copy or clone of data that may be readable, writeable, read-only, write-only, or the like and/or may comprise metadata from a network association module 202, a requester module 204, provider modules 206, and/or other associated modules, metadata relating to the physical environment within which the volume is located, and metadata relating the application environment. Among the possible physical environment metadata is metadata relating to initiators, switches, processors, recording media, networks, user computers, storage administrator computers, secondary data storage tiers. Among the possible application environment metadata is metadata relating to operating system type, virtualization server type, storage appliance type, database type, and the like. In some embodiments, a snapshot or point in time copy may be created for a storage volume 16 (e.g., creating a snapshot of an entire volume 16 or a portion of the volume 16), a file system (e.g., creating a snapshot of one or more files, folders, or the like), a database (e.g., creating a snapshot of one or more database tables), an operating system, a virtual machine, or the like. A snapshot or point in time copy may be used to backup and/or to restore data on the system. In certain embodiments, a snapshot or point in time copy may be used to create an application checkpoint, a system restore point, a system image, or the like. A snapshot service provider, as used herein, is a hardware and/or software module or entity that coordinates or creates snapshots for a storage volume 16 or other set of data. A snapshot service provider may comprise a server, an owner, a manager 18, an application, an operating system, a hypervisor or virtualization server, a DBMS, or the like. A snapshot service provider may create a snapshot itself, may coordinate the creation of a snapshot, may assist in creating a snapshot (e.g., may quiesce operations on a volume during a snapshot operation), or the like.

In some embodiments, the network association module 202 discovers one or more networked volumes 16 and/or obtains identifying information for each discovered volume 16 (e.g., one or more volume identifiers). In certain embodiments, the network association module 202 may discover and identify data volumes 16 communicatively attached to the data protection module 150, the data network 12, or the like. In other embodiments, the network association module 202 receives an identification of attached data volumes 16 (e.g., one or more volume identifiers) from another device or module, a user, or the like. In some embodiments, the network association module 202 determines whether a data protection relationship exists for an attached volume 16 and ignores those volumes 16 for which no data protection relationship exists, prompts a user whether to create a data protection relationship for volumes 16 for which no data protection relationship exists, or the like. As used herein, a data protection relationship refers to an organizational relationship between a storage volume 16 and a storage appliance 10, 48 tasked with maintaining a backup and/or snapshot of data of the storage volume 16.

In certain embodiments, the network association module 202 is configured to determine an owner or manager 18 for a discovered storage volume 16. As described above, the network association module 202 may correlate or match discovered storage volumes 16 with one or more owners, servers, snapshot service providers, and/or managers 18 identified by a user. In a further embodiment, the network association module 202 may query a storage volume 16 and the storage volume 16 may respond to such a query with an indicator of an owner or manager 18 associated with the storage volume 16. In another embodiment, the network association module 202 determines the owner, server, or manager 18 for a discovered storage volume 16 by correlating one or more identifiers of the storage volume 16 with identifiers of owners, servers, or other managers 18 in a management data structure (e.g., a settings file, a networking table, an IP table, a storage table, an operating system database, a virtualization server database, a DBMS management table, or the like). For example, the network association module 202 may search a database of an owner, server, or other manager 18 for entries matching the storage volume 16 identifier. As another example, the network association module 202 may use the storage volume identifier to lookup information from a table of managed storage volumes 16. In a further embodiment, the network association module 202 may determine an owner, server, or other manager for a storage volume 16 in response to a query to the storage volume 16, by examining communications (e.g., packets) associated with the storage volume 16, or the like.

A storage volume identifier, in one embodiment, may be a unique identifier associated with the storage volume 16 and/or with a hardware device 14 hosting the storage volume 16. In some embodiments, the storage volume identifier may be a globally unique identifier (GUID). In other embodiments, a storage volume identifier may be locally unique, that is unique to a local network 12 connecting the storage appliance 10, 48 and storage volumes 16, or the like. Examples of suitable storage volume identifiers may include, but are not limited to, a storage volume name, a storage volume address, a network address (e.g., a media access control (MAC) address, an IP address, or the like), a hardware identifier (e.g., a vendor or manufacturer provided serial number), or the like.

In some embodiments, the network association module 202 associates a storage volume 16 with an owner, server, snapshot service provider, or another manager 18 of a plurality of supported types (e.g., supported owner types, server types, snapshot service provider types, manager types) for creating snapshots. For example, the network association module 202 may associate or correlate a storage volume 16 with an operating system, a hypervisor or virtualization server, a DBMS, a database, and/or another manager 18 (e.g., hardware, firmware, and/or software used to manage computer resources and provide services) associated with a discovered volume 16 and providing a snapshot operation or service. The data protection module 150 may support a plurality of operating systems, hypervisors or virtualization servers, DBMSs, and/or other managers 18. For example, the data protection module 150 may support a different snapshot operation, different snapshot characteristics or parameters, or the like based on or adapted to different types of owners, servers, or managers 18.

The network association module 202 may associate a server, operating system, hypervisor, DBMS, or other manager 18 with a storage volume 16 by referencing stored information regarding the storage volume 16, by querying the storage volume 16, or the like. For example, the network association module 202 may correlate a storage volume identifier with a database of managed storage volumes 16 to identify an associated server, operating system, hypervisor, DBMS, or other manager 18 for the storage volume 16.

In some embodiments, the network association module 202 may detect or determine one or more applications associated with a storage volume 16. An associated application may be one that stores data in the storage volume 16, operates on data in the storage volume 16, or otherwise performs input/output activity on the storage volume 16. The associated applications may be discovered by referencing a database or other data structure with information regarding managed storage volumes 16, monitoring a storage volume 16, based on a manager 18 for a storage volume 16, or the like. In a further embodiment, one or more applications associated with a storage volume 16 may be registered with a manager 18 for the storage volume 16.

The requester module 204, in one embodiment, is configured to initiate, request, or execute a snapshot operation or data replication operation for a storage volume 16 or other set of data. The requester module 204, in certain embodiments, initiates, requests, or executes a snapshot operation for a storage volume 16 based on or according to a protection plan for the storage volume 16. The requester module 204, in a further embodiment, may initiate a snapshot operation or data replication operation in response to a snapshot request, a data replication request, or the like from another module or entity. As used herein, a snapshot operation or data replication operation is a procedure that copies, clones, or replicates data to a different storage location, creating a snapshot or point in time copy of the data. A snapshot or data replication operation may copy or replicate data in its entirety, record changes to the data, or the like. The requester module 204, in one embodiment, is located on, installed on, integrated with, or in communication with a storage appliance 10, 48, and the storage appliance 10, 48 may initiate the snapshot operation on a source device 14 over the network 12. In another embodiment, the requester module 204 may be located on, installed on, integrated with, or in communication with a source device 14, and may receive a snapshot request from a storage appliance 10, 48, or the like.

In some embodiments, the requester module 204 initiates a data replication or snapshot operation for a storage volume 16 that is based on, or adapted to operate in a manner compatible with data copying functions/features made available by the owner, server, or manager 18 associated with the storage volume 16 by the network association module 202. In certain embodiments, the requester module 204 initiates the data replication operation using tools or functions provided by the owner or manager 18, by a snapshot service provider associated with the owner or manager 18, or the like. In one embodiment, the requester module 204 initiates a data replication or snapshot operation for a storage volume 16 that ensure that the data is consistent by using features of the owner, server, or manager 18 associated with the storage volume 16 that provide data consistency prior to initiating a data replication or snapshot operation. The requester module 204, in one embodiment, may request a snapshot operation via the owner or manager 18, via an associated snapshot service provider, or the like. For example, where the owner or manager 18 of a storage volume 16 is a Microsoft® Windows® operating system or Windows® server, the associated snapshot service provider may be a volume shadow-copy service (VSS) and the requester module 204 may initiate a VSS session to create a snapshot, or the like.

In a further embodiment, where the owner or manager 18 of a storage volume 16 is a virtualization server or hypervisor (e.g., a VMware® vCenter server, VMware® ESX® or ESXi hypervisor, or the like), the requester module 204 may initiate a snapshot operation based on or adapted to the virtualization server or hypervisor, using an API of the virtualization server or hypervisor, or the like. For example, in certain embodiments, a snapshot operation for a storage volume 16 associated with a virtualization server and/or hypervisor may include one or more of creating a snapshot of one or more virtual machines, taking a snapshot of a storage volume 16 storing the snapshot of the one or more virtual machines, and/or deleting the snapshot of the one or more virtual machines. In a further embodiment, the requester module 204 may initiate or request a snapshot operation for a virtual machine, a storage volume of a virtual machine, or the like using a snapshot service provider of a guest operating system of the virtual machine (e.g., a VSS session of a Windows® guest operating system, or the like).

The requester module 204, in some embodiments, instructs one or more applications using the storage volume 16 to prepare for the snapshot or data replication operation. In certain embodiments, the requester module 204 instructs the applications using the storage volume 16 to establish a consistency point. In further embodiments, the requester module 204 may send a quiesce command to one or more applications using the storage volume 16. For example, the requester module 204 may instruct one or more VSS writers to enter a quiescent state in preparation for a VSS snapshot operation. In some embodiments, the requester module 204 directly issues commands to the applications. In other embodiments, the requester module 204 prepares the applications via commands of the manager 18 (e.g., the operating system, virtualization server or hypervisor, DBMS) associated with the storage volume 16. In yet other embodiments, the requester module 204 issues commands to the applications using one or more third-party tools, interfaces, or the like.

In one embodiment, the requester module 204 initiates snapshots according to a schedule, a protection plan, or the like. The schedule and/or protection plan may indicate a frequency and/or type of snapshot creation. For example, the requester module 204 may initiate a full backup snapshot every Sunday as well as incremental backups each Monday through Saturday, or the like. In some embodiment, a user may create the schedule or protection plan by defining when to create snapshots, which data to back up, what type of snapshot to generate, or the like. In certain embodiments, the schedule or protection plan may be based on a quality of service (QoS) level or priority level associated with the storage volume 16. For example, the requester module 204 may perform snapshot operations more frequently on storage volumes 16 with higher QoS levels and less frequently on storage volumes 16 with lower QoS levels, or the like. The requester module 204 can also be configured to implement a schedule or criteria for the deletion of snapshots relating to a volume. Among the potential bases for deleting a snapshot are the quality of a snapshot relative to other snapshots, the elapse of a defined amount of time, storage limitations, user-initiated, and the like.

In some embodiments, the requester module 204 functions as a remote requester. As used herein, a remote requester is a snapshot requester that operates remotely from a storage volume 16 and its manager 18 and/or from an associated snapshot service provider to initiate a snapshot or data replication operation. For example, the requester module 204 may execute on a storage appliance 10, 48 (e.g., as computer readable program code, as hardware, or both), may be in communication with a remote requester or remote requester module executing on a storage appliance 10, 48, or the like, so that a snapshot operation may be initiated from the storage appliance 10, 48 directly, from a device driver for the storage appliance 10, 48, or the like. While functioning as a remote requester, the requester module 204 may issue commands directly from the storage appliance 10, 48, instead of issuing commands via an intermediary located on a host device 14 of the storage volume 16, or the like.

The requester module 204, in certain embodiments, may comprise both software and/or hardware of a storage appliance 10, 48 and software and/or hardware executing on a host device 14 for a storage volume 16, and may communicate a snapshot request internally. For example, software and/or hardware of the requester module 204 executing on the storage appliance 10, 48 may send a snapshot request to software and/or hardware of the requester module 204 executing on the host device 14, such as a device driver for the storage appliance 10, 48 or the like, so that the snapshot operation is initiated from the storage appliance 10, 48. In another embodiment, the requester module 204 emulates the identified manager 18 of the storage volume 16 to provide the remote requester, to satisfy requirements of an associated snapshot service provider or the like. For example, the requester module 204 may execute in a virtual machine running a Windows® guest operating system on the storage appliance 10, 48, or the like, in order to remotely initiate a VSS session for a storage volume 16 associated with a Windows® operating system. In this manner, in certain embodiments, the requester module 204 may comprise a requester compatible with the identified manager 18 (e.g., a VSS requester) so that a separate requester installed on the host device 14 is not necessary to request a snapshot operation. In other embodiments, the request module 204 may initiate a snapshot operation from a storage appliance 10, 48; on behalf of a storage appliance 10, 48; or the like, in cooperation with (e.g., triggering, sending a request to, or the like) a requester executing on the host device 14 for the storage volume 16.

In certain embodiments, the requester module 204 coordinates with the provider module 206 to achieve data replication of data on the storage volume 16. For example, the requester module 204 may indicate that the provider module 206 should copy data in response to the requester module 204 determining that the application using the storage volume 16 are in a quiescent state. In some embodiments, the requester module 204 is co-located with the provider module 206. For example, the requester module 204 may be a component of the provider module 206. By integrating a requester module 204 and a provider module 206, in certain embodiments, the requester module 204 and the provider module 206 may be installed simultaneously on a source device 14, using a single install operation. As described below, the requester module 204 and/or the provider module 206 may comprise a private or internal API that supports one or more custom commands for additional services or functionality, such as remote replication of a snapshot or the like. In other embodiments, the requester module 204 is communicatively coupled to the provider module 206.

The provider module 206, in one embodiment, is configured to copy data of a storage volume 16 or another set of data. In some embodiments, the provider module 206 copies the data using an operation or function based on the identified manager 18 (e.g., server, operating system, virtualization server or hypervisor, DBMS). For example, the data may be copied based on a server type of a server associated with the storage volume 16. The provider module 206 may be associated with a specific manager 18 or manager type, with a storage appliance 10, 48, or both.

For example, in certain embodiments, the provider module 206 may support or be compatible with multiple types of managers 18 (e.g., server, operating system, virtualization server or hypervisor, DBMS), multiple types of storage appliances 10, 48, or the like. In other embodiments, the data protection module 150 may comprise multiple provider modules 206, supporting or compatible with different types of managers 18, different types of storage appliances 10, 48, or the like. In some embodiments, the provider module 206 is configured to create a snapshot of data of a storage volume 16 or other set of data. In certain embodiments, the provider module 206 creates a snapshot using or in response to a snapshot operation of a snapshot service provider associated with or used by an owner or manager 18 of a storage volume 16. A type of snapshot created by the provider module 206 may be based on the snapshot service provider for the storage volume 16 and/or a schedule or protection plan associated with the storage volume 16.

In certain embodiments, a snapshot type includes a full snapshot. A full snapshot may include a full backup of all the data (e.g., files, applications, programs, databases, or the like) of a storage volume 16. In a further embodiment, a snapshot type includes a differential snapshot, such as a backup of data that has changed since the last full snapshot, changes to data, or the like. For example, if a full snapshot is generated on a Sunday, a differential snapshot created on a Monday would only include data that changed since Sunday, a differential snapshot on Tuesday would only include data that changed since Sunday, and so on. In some embodiments, the snapshot type includes an incremental snapshot, which is a backup of data that changed since the last snapshot, either full, differential, incremental, or the like. For example, an incremental snapshot created on Tuesday may back up data that was modified since a previous incremental snapshot on Monday.

In one embodiment, the provider module 206 stores or moves the copied data (e.g., the snapshot) to a non-volatile storage location. The non-volatile storage location may include a storage appliance 10, 48, non-volatile storage of a backup device 20 such as a backup server, a cloud server, or the like. The provider module 206 may store the snapshot or other copied data in a plurality of non-volatile storage locations, partitions, devices, or the like, for redundancy and/or striping.

In some embodiments, the provider module 206 may update data previously copied from the storage volume 16 (e.g., a snapshot). In certain embodiments, the newly copied data may be used to modify the previously copied data. For example, the provider module 206 may create an incremental snapshot (e.g., a snapshot of data modified since a previous snapshot) and update the previously copied data based on the incremental snapshot, or the like.

In some embodiments, the provider module 206 is configured to create a remote copy of a snapshot or other copied data of a storage volume 16 or other data set. The remote copy may be based on snapshot data acquired by the provider module 206. In certain embodiments, the provider module 206 automatically creates the remote copy in response to a specific request from the requester module 204. The remote copy of the data may be stored to a non-volatile storage medium remote from the storage volume 16 and the storage appliance 10, 48. In certain embodiments, the provider module 206 creates the remote copy in response to a request from the requester module 204 using an interface between the requester module 204 and the provider module 206. As described above, the interface may be a custom or private interface used to expand the functionality of the provider module 206. For example, a private application programming interface (API) may be used between the requester module 204 and the provider module 206 to automatically create the remote copy in response to a snapshot being created, allowing the provider module 206 to selectively provide remote replication, for certain snapshots for which the requester module 204 has requested remote replication.

In some embodiments, the provider module 206 copies data (e.g., creates a snapshot) in response to the input/output activity of the storage volume 16 being in a quiescent state. The provider module 206 may cooperate with the manager 18 and/or an associated snapshot service provider to temporarily quiesce input/output activity of a storage volume 16 so that the provider module 206 may create an application-consistent snapshot. In certain embodiments, the provider module 206 monitors input/output activity for the storage volume 16 to determine whether the quiescent state is reached. In other embodiments, the provider module 206 receives an indication of the quiescent state from another device or module, such as a manager 18, the requester module 204, or the like and copies data of the storage volume 16 (e.g., creates a snapshot) in response to receiving the indication. In some embodiments, the provider module 206 may copy data or create a snapshot in response to one or more applications associated with the volume 16 establishing a consistency point. For example, the provider module 206 may receive an indication that the consistency point is established and may copy the data in response to receiving the indication.

In some embodiments, the requester module 204 is configured to initiate a snapshot relative to a storage element or group of storage elements and initiate a restoration of a storage element or group of storage elements using a snapshot. Any restoration can be based upon an assessment of the quality of multiple snapshots that can be used for the restoration and/or a quality-of-service goal or goals associated with the storage element. Further, any restoration can use snapshot metadata to restore, as appropriate, the operating system environment, VMware® environment including virtual machines, virtual machine names, VMware® data store names, IP addresses, and the like. This advanced snapshot metadata typically enables restoring an environment in less time, with greater accuracy, and with less storage administrator interaction.

Figure 3:
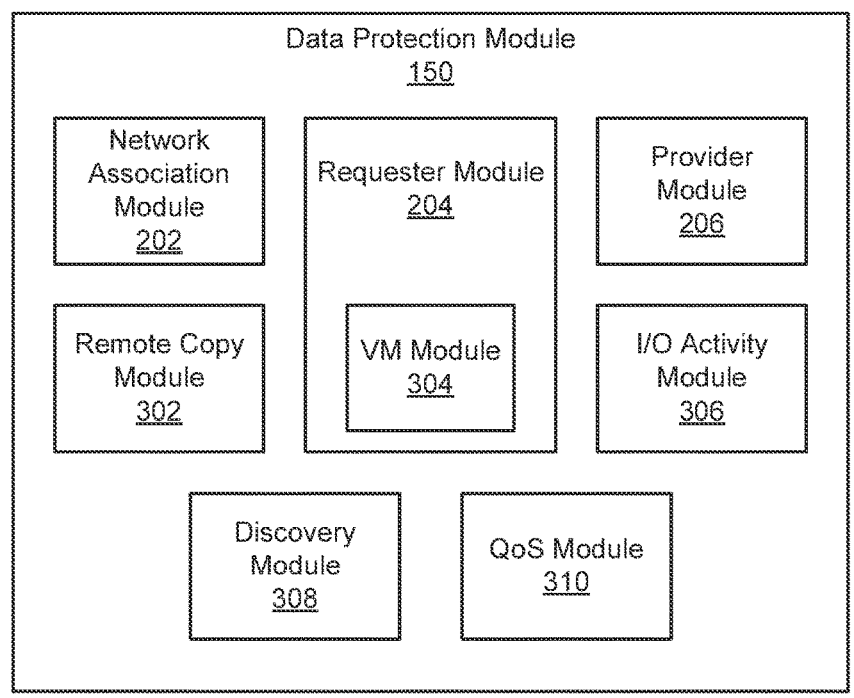
FIG. 3 is a schematic block diagram illustrating another embodiment of a data protection module.

FIG. 3 depicts another embodiment of a data protection module 150 for creating an application-aware snapshot. The data protection module 150 may be substantially similar to the data protection module 150 described above with regard to FIGS. 1A, 1B, and 2. In the depicted embodiment, the data protection module 150 includes a network association module 202, a requester module 204, and a provider module 206, which may be substantially similar to the network association module 202, the requester module 204, and the provider module 206 described above with reference to FIG. 2. Additionally, the data protection module 150 depicted in FIG. 3, in one embodiment, includes one or more of a remote copy module 302, a virtual machine module 304, an input/output activity module 306, a discovery module 308, and a quality of service module 310, which are described below in more detail.

The network association module 202, the requester module 204, and the provider module 206 may be substantially similar to the network association module 202, the requester module 204, and the provider module 206 described above with regards to FIG. 3. More specifically, the network association module 202, in some embodiments, determines or discovers one or more storage volumes 16 and correlates storage volumes 16 with an owner, manager 18, server, and/or snapshot service provider. The requester module 204, in certain embodiments, initiates a snapshot operation for the storage volume 16 in response to a snapshot request from a storage appliance 10, 48, based on an owner, manager 18, server, and/or snapshot service provider for the storage volume 16, or the like. The provider module 206, in some embodiments, creates a snapshot of data of the storage volume 16 in the storage appliance 10, 48 in response to the determined owner, manager, server, and/or snapshot service provider quiescing activity for the storage volume 16.

The remote copy module 302, in one embodiment, is configured to create a remote copy of data of the storage volume 16, of a snapshot, or the like. The remote copy of the data may be stored in a non-volatile storage medium remote from the storage volume 16 and the storage appliance 10, 48. In some embodiments, the remote copy module 302 uses a snapshot generated by the provider module 206 to create the remote copy. In certain embodiments, the remote copy module 302 creates the remote copy in response to a specific request from the requester module 204, using a private or internal API between the requester module 204 and the provider module 206, or the like, as described above.

In certain embodiments, the remote copy module 302 creates the remote copy in response to a request from the requester module 204 using an interface between the requester module 204 and the provider module 206. As described above, the interface may be a custom or private interface used to expand the functionality of the provider module 206. For example, a private, custom, or internal application programming interface (API) may be used between the requester module 204 and the provider module 206 to automatically cause the remote copy module 302 to create the remote copy in response to a snapshot being created, allowing the provider module 206 to selectively provide remote replication for certain snapshots for which the requester module 204 has requested remote replication, or the like, in cooperation with the remote copy module 302.

In some embodiments, the remote copy module 302 creates the remote copy using a protocol supported by the identified storage volume manager 18. Examples of remote copy protocols include the remote file copy protocol, the peer-to-peer remote copy (PPRC) protocol, the TrueCopy protocol, the secure copy protocol, and the like. In certain embodiments, the remote copy module 302 creates the remote copy using services provided by the storage volume manager 18. In some embodiments, an operating system supporting a storage volume 16 may include tools, commands, and/or services to facilitate remote copying and the remote copy module 302 may be configured to use tools, commands, and/or services corresponding to the particular operating system used to manage the storage volume 16. For example, the remote copy module 302 may use a UNIX "remote copy" command for storage volumes 16 managed by a UNIX operating system.

The remote copy module 302, in one embodiment, creates the remote copy using an asynchronous replication process. As used herein, an asynchronous replication process is a replication process that writes data to a primary storage area first (e.g., a storage volume 16, the primary data storage system 28) and that replicates the data to secondary storage area (e.g., a storage appliance 10, 48; a backup device 20) at a later time. The primary storage area, however, does not wait for the data to be written to the secondary storage area before acknowledging the write request, accepting new write requests, or the like, which may improve availability of the primary storage area, unlike a synchronous replication process. In some embodiments, the remote copy module 302 creates the remote copy using a semi-synchronous replication process. As used herein, a semi-synchronous replication process allows the primary storage area to accept new write requests after the secondary storage area acknowledges receipt of the data, but before the secondary storage area copies the data, or the like. In yet other embodiments, the remote copy module 302 may create the remote copy using a synchronous replication process in which the primary storage area waits until the data is copied to the secondary storage area before it acknowledges the write request and accepts new write requests.

It should be appreciated that if the data copied to the remote destination is coherent to the remote destination such that the remote destination can restore not only the data but the physical environment configuration, the remote copy is functionally a restoration operation.

The Virtual Machine (VM) module 304, in one embodiment, is configured to emulate and/or virtualize an environment for the requester module 204, so that the requester module 204 may execute on a storage appliance 10, 48 and initiate a snapshot procedure on a source device 14 for a storage volume 16 or other data set. For example, for a manager 18 comprising a Windows® operating system with a volume shadow-copy service (VSS), the VSS may require that a request come from a requester in a Windows® environment, and the VM module 304 may provide a virtual machine with a Windows® guest operating system in which the requester module 204 may execute. In other embodiments, the VM module 304 may emulate or virtualize other environments, guest operating systems, or the like based on a manager 18 for a storage volume 16.

In some embodiments, the VM module 304 emulates an operating system or other manager 18 associated with a storage volume 16. For example, the VM module 304 may support, in a virtual environment, an operating system matching an operating system owning or managing the storage volume 16. In certain embodiments, the VM module 304 may emulate an entire operating system while in other embodiments, the VM module 304 may emulate only portions of the operating system associated with data replication, with a requester (e.g., the requester module 204), or the like.

By emulating a storage volume manager 18 or another snapshot service provider associated with the storage volume 16, the VM module 304, in one embodiment, may enable the requester module 204 to act as a remote requester, as described above. In other embodiments, the VM module 304 may allow the data protection module 150 to directly quiesce input/output activity of a storage volume 16. While the VM module 304 is depicted as a component of the requester module 204, in some embodiments, the VM module 304 is a separate module that assists the requester module 204, or the like.

The input/output (I/O) activity module 306, in one embodiment, is configured to monitor input/output activity of a storage volume 16, of one or more applications associated with a storage volume 16, or the like. The I/O activity module 306, in a further embodiment, may be configured to quiesce, stop, halt, and/or pause input/output activity for a storage volume 16. For example, the I/O activity module 306 may use a function or command of a manager 18, a snapshot service provider, or the like associated with a storage volume 16 to quiesce input and/or output activity for the storage volume 16. In some embodiments, the input/output activity module 306 signals the provider module 206 to copy data of a storage volume 16 in response to the one or more applications quiescing input/output activity. While the input/output activity module 306 is depicted as a separate module, in some embodiments, the I/O activity module 306 may be a component of the requester module 204 and/or the provider module 206.

In some embodiments, the input/output activity module 306 identifies a level of input/output activity for the storage volume 16. The input/output activity module 306 may further identify one or more applications associated with the storage volume 16 and a level of input/output activity corresponding to each associated application. In certain embodiments, the input/output activity module 306 may determine whether an associated application using the storage volume 16 is capable of quiescing itself. As used herein, quiescing an associated application comprises temporarily disabling the input/output activity of the application. In some embodiments, quiescing an associated application may include flushing buffers for outstanding writes associated with the application.

The input/output activity module 306, in one embodiment, may send quiescing commands to quiescent-capable applications. Quiescent-capable applications may include VSS-aware applications, such as VSS writers. In certain embodiments, an application capable of quiescing itself may report its activity state to the input/output activity module 306, thereby providing an indication of whether the application is in a quiescent state. Thus, the input/output activity module 306, in one embodiment, may verify that a quiescent state is achieved based in part by indications or responses received from the quiescent-capable applications. In some embodiments, the input/output activity module 306 may log quiescing errors.

Quiescing applications prior to copying data may allow for application-consistent data replication and for consistency points to be established. An application consistent data replication, such as an application-consistent snapshot, may reduce the overhead and/or time used by each program to restore itself after a failure or restart. For example, an application-consistent snapshot may allow the application to recover to its last input/output state simply by loading a latest application-consistent snapshot, with little or no additional processing to recover data, to determine state, or the like. Additionally, quiescing applications prior to copying data for creating a snapshot, in certain embodiments, may reduce a likelihood of data corruption in the event of a failure and may reduce the input/output logs maintained by the applications for recovery, or the like.

In certain embodiments, the input/output activity module 306 may quiesce an application by sending a command to or through the manager 18, owner, server, or snapshot service provider associated with the storage volume 16. For example, if the snapshot service provider is a Volume Shadow Copy Service (VSS), the input/output activity module 306 may instruct VSS writers to quiesce activity and establish a consistency point. In some embodiments, the input/output activity module 306 may send a quiescing command using a storage volume manager 18 or other snapshot service provider. Additionally, in certain embodiments, the input/output activity module 306 may initiate a quiescing service provided by the local manager 18 or snapshot service provider. Alternatively, where the requester module 204 acts as a remote requester, the input/output activity module 306 may quiesce the applications by directly issuing quiescing commands, or the like.

The discovery module 308, in one embodiment, is configured to detect one or more storage volumes 16 (e.g., associated with a storage appliance 10, 48, available via a data network 12, or the like), to acquire identifying information for each detected storage volume 16, or the like. In some embodiments, the discovery module 308 accesses a Local Area Network (LAN) adapter and detects one or more storage volumes 16 on the same LAN as the storage appliance 10, 48, on the same LAN as a source device 14, or the like. In some embodiments, the discovery module 308 may automatically discover the storage volumes 16. In certain embodiments, the discovery module 308 may be triggered manually to search for storage volumes 16, based on user input received from a user through a user interface, or the like.

The discovery module 308, in one embodiment, determines or receives an identifier (e.g., a name, an address, or the like) for a server, owner, snapshot service provider, or other manager 18, based on user input, based on a query of the network 12, based on an analysis of one or more settings or networking files, or the like. The discovery module 308 may detect or discover one or more storage volumes 16 associated with an identified server, owner, snapshot service provider, or other manager 18 for the detected or discovered storage volumes 16.

In certain embodiments, the discovery module 308 acquires identifying information by analyzing network traffic of the storage volumes 16. For example, the discovery module 308 may parse message headers to acquire network addresses for a storage volume 16, to associate or correlate a storage volume 16 with a manager 18, or the like. In some embodiments, the discovery module 308 acquires identifying information by querying a storage volume 16. The discovery module 308 may pass or provide the identifying information to the network association module 202 for use in identifying a snapshot service provider, owner, manager 18, or server associated with a discovered storage volume 16, as described above. The identifying information may be in the form of one or more storage volume identifiers. A storage volume identifier, in one embodiment, may be a unique identifier associated with the storage volume 16 and/or with a hardware device 14 hosting the storage volume 16. In some embodiments, the storage volume identifier may be a globally unique identifier (GUID). In other embodiments, the storage volume 16 may be locally unique, that is unique only to the LAN on which the storage volumes 16 reside. Examples of suitable storage volume identifiers include, but are not limited to, a storage volume name, a network address—such as a (MAC) address, an (IP) address, or the like, a hardware identifier—including vendor- or manufacturer-provided serial numbers, and the like.

The quality of service (QoS) module 310, in one embodiment, is configured to identify a QoS level associated with a storage volume 16. In certain embodiments, the QoS module 310 is further configured to schedule data replication operations of the storage volume 16, determine or create a protection plan for the storage volume 16, or the like based on the identified QoS level. For example, a storage volume 16 associated with a higher QoS level may be scheduled for more frequent data replication than a storage volume 16 associated with a lesser QoS level, or the like. In some embodiments, the QoS level is determined based on a characteristic of the data of the storage volume 16. In other embodiments, the QoS level is determined based on a data protection service or service level purchased for or subscribed to for the storage volume 16. Metadata related to the QoS module 310 can be included in the snapshot. Further, the protection plan can define a quality for a snapshot. For instance, as between a full snapshot of a volume that was interrupted and an earlier full snapshot of the same volume that was not interrupted, the protection plan may assign a higher quality to the earlier, uninterrupted full snapshot relative to the later full snapshot that was interrupted. The protection plan can additionally define a retention plan or policy that defines which snapshot of two or more snapshots relating to a volume is retained. The retention plan or policy can use QoS metadata to facilitate the determination. To continue with the above example, the quality of the earlier full snapshot is superior to the quality of the later full snapshot that was interrupted. The retention policy may be such that earlier full snapshot that was not interrupted is preferentially retained relative to the later full snapshot that was interrupted. Other bases for retaining one or more snapshots of a volume relative to other snapshots of the volume are feasible.

In certain embodiments, the QoS module 310 is further configured to group storage volumes 16 or elements (frequently but not necessarily of similar QoS levels) and to schedule data replication operations on a group basis (e.g., determining a protection group for storage volumes 16 based on QoS levels, determining a protection plan for a protection group based on QoS levels, or the like). Thus, storage volumes 16 in a particular group may be scheduled for the same or similar level of data replication (e.g., a full snapshot or incremental snapshot) during the same timeframe. For example, the storage volumes 16 associated with a first group may be scheduled for a full snapshot every Sunday and daily incremental snapshots while storage volumes 16 associated with a second group may be scheduled for incremental snapshots every other day.

In one embodiment, the data protection module 150 (e.g., one or more of the depicted modules 202, 204, 206, 302, 304, 306, 308, 310 individually or in cooperation) may provide a user interface allowing a user to manage, configure, and/or schedule snapshot operations for one or more storage volumes 16 (e.g., application-aware snapshots) or one or more storage elements. The user interface may comprise a graphical user interface (GUI), a command line interface (CLI), an application programming interface (API) to receive user input from a user through another module or entity, a network interface, or another interface through which the data protection module 150 or another module 202, 204, 206, 302, 304, 306, 308, 310 may receive user input.

As described above, the discovery module 308 may detect, discover, or otherwise determine an identifier or other identifying information for a storage volume 16, for a server, owner, snapshot service provider, or manager 18 for a storage volume 16, or the like. In one embodiment, the discovery module 308 may determine an identifier (e.g., a name, an address, an IP address, a label, a category, or the like) for a server, owner, or other manager 18 (e.g., an operating system, a hypervisor or virtualization server, a DBMS, a storage appliance 10, 48, a hardware server computing device, or the like) based on user input. For example, a user may input a name, IP address, or another identifier for a server or other manager 18 via a user interface, and the discovery module 208 may receive the user input comprising the identifier, either directly or indirectly, from the user. The network association module 202, as described above, may automatically correlate or match one or more storage volumes 16 discovered by the discovery module 308 with the server or other manager 18 based on the identifier provided by a user. The network association module 202, in certain embodiments, may present the one or more discovered storage volumes 16 to a user, through a user interface.

The requester module 204 may be configured to schedule one or more snapshot operations for one or more storage volumes 16 based on user input. In one embodiment, the requester module 204 may assign one or more storage volumes 16 (or storage elements) to a protection group based on user input and schedule one or more snapshot operations for each of the storage volumes 16 (or storage elements) of the protection group. The requester module 204, in a further embodiment, may define a protection plan for a storage volume 16 (or storage element), for a protection group, or the like based on user input and may schedule one or more snapshot operations according to the protection plan. For example, the requester module 204 may provide a user interface or other tool allowing a user to define a protection group, to select storage volumes 16 (or storage elements) for the protection group, to define or select a protection plan for the protection group, or the like.

The requester module 204 may receive user input defining or selecting a protection plan for a storage volume 16 and/or for a protection group, such as a snapshot frequency (e.g., hourly, daily, weekly, monthly), a date and/or time for a snapshot, a protection strength for the protection plan (e.g., low, medium, high), a QoS level or priority for data, a trigger for a snapshot (e.g., after startup), a delay to wait before creating a snapshot, an interval between creating snapshots, a quality of snapshot determination, retention policy, or the like. The requester module 204, in certain embodiments, may receive one or more parameters for a snapshot and/or for a protection plan from a user, such as a filename for a snapshot, a name prefix for a snapshot, a number of snapshots to retain or keep, a failure contingency for a snapshot (e.g., try again, cancel the protection plan, notify a user), an expiration date and/or time for a protection plan, an active date and/or time for a protection plan, an email address or other notification address to send a snapshot notification, credentials (e.g., a username and/or password) for accessing a storage volume 16 and/or a manager 18, or the like. Metadata related to the requester module 204 can be included in the snapshot.

As described above, a snapshot operation requested or initiated by the requester module 204 may be adapted to or based on a type of the server, owner, or manager 18 associated with a storage volume 16 and the requester module 204 may support multiple types (e.g., an operating system type, a virtualization server type, a storage appliance type, a database type, or the like). In certain embodiments, a protection group may include storage volumes 16 (or elements) associated with servers, owners, or managers 18 of different types, and the requester module 204 may use different snapshot operations adapted to or based on the different types for the different storage volumes 16.

For example, for a storage volume 16 associated with a Windows® server, the requester module 204 may initiate a VSS session. A different storage volume 16 of the same protection group may be associated with a VMWare® VCenter Server or another virtualization server or hypervisor, the requester module 204 may initiate a snapshot operation including one or more of: quiescing one or more virtual machines, creating one or more snapshots of the one or more virtual machines (e.g., using an API or service of the virtualization server or hypervisor), creating a snapshot of the storage volume 16 storing the snapshot of the one or more virtual machines, and/or deleting the one or more snapshots of the one or more virtual machines.

Figure 4:
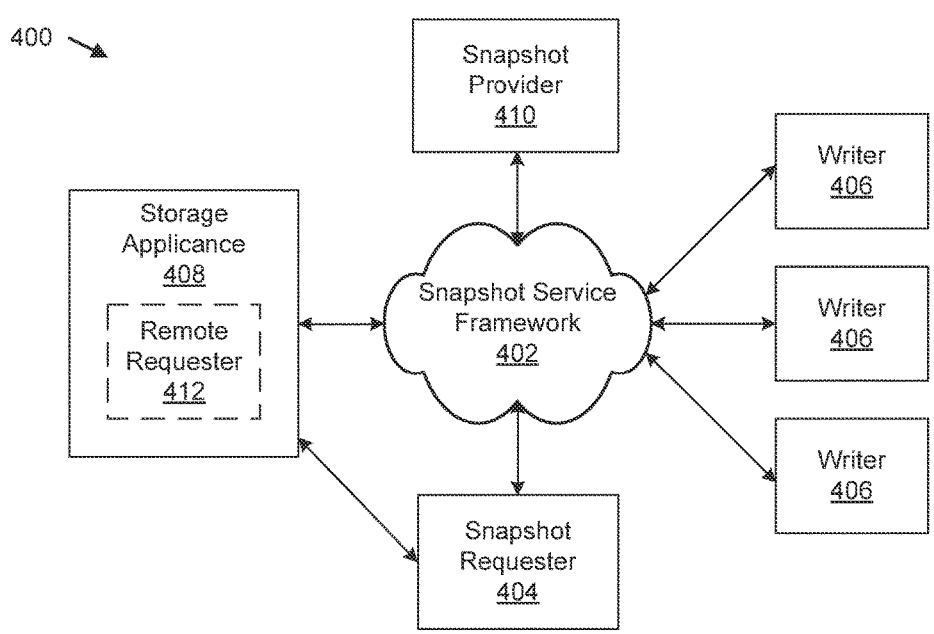
FIG. 4 is a schematic block diagram of one embodiment of a system comprising a snapshot service provider.

FIG. 4 depicts one embodiment of a system 400 for creating application-aware snapshots. The system 400 comprises a snapshot service framework 402, a snapshot requester 404, a plurality of writers 406, a storage appliance 408, and a snapshot provider 410. In certain embodiments, the storage appliance 408 includes a remote requester 412. In some embodiments, the storage appliance 408 may be substantially similar to the storage appliance 10, 48 and/or the data protection module 150 described above with reference to FIGS. 1A, 1B, and 2-3. In certain embodiments, the snapshot provider 410 may be substantially similar to the provider module 206 described above with reference to FIGS. 2 and 3.

The snapshot service framework 402, in one embodiment, is a snapshot service provider for an associated storage volume 16 or other data set, as described above. The snapshot service framework 402 facilitates creation of a snapshot. In some embodiments, the snapshot service framework 402 is provided by a server, an operating system, a hypervisor, a DBMS, or another manager 18 for the storage volume 16 or other data set. For example, the snapshot service framework 402 may be a Volume Shadow Copy Service (VSS) provided by a Windows® operating system, or the like.

The snapshot requester 404, in one embodiment, initiates the snapshot operation in response to a command or request from the storage appliance 408 (e.g., from the requester module 204 described above). In certain embodiments, the snapshot requester 404 is installed on and/or co-located with the server, operating system, hypervisor, DBMS, or manager 18 and is accessed by the storage appliance 408 via the network 12 (e.g., a device driver for the storage appliance 408, a snapshot utility or tool for the storage appliance 408, or other computer executable code). In other embodiments, the snapshot requester 404 is a third-party tool installed on the hardware device 14 (e.g., a server) supporting the storage volume 16 or other data set. In some embodiments, the snapshot requester 404 initiates the snapshot operation and the snapshot service framework 402 sends quiescing commands to the plurality of writers 406, or the like.

The writers 406, in one embodiment, are snapshot-aware applications capable of quiescing input and/or output to one or more storage volumes 16 in response to a quiescing command. The quiescing command may be received from the snapshot service framework 402, the snapshot requester 404, and or the storage appliance 408 (e.g., a remote requester 412). In some embodiments, a writer 406 flushes buffers for outstanding writes associated with the application. In certain embodiments, a writer 406 notifies the snapshot service framework 402, snapshot requester 404, and/or the storage appliance 408 when it has quiesced input and/or output operations.

The snapshot provider 410, in one embodiment, is configured to copy and store data of the storage volume 16 or other data set associated with the snapshot service framework 402 (e.g., a snapshot) to the storage appliance 408. In certain embodiments, the snapshot provider 410 creates the snapshot in response to the plurality of writers 406 entering a quiescent state. In some embodiments, the storage appliance 408 also includes a remote requester 412. The remote requester 412, in one embodiment, may comprise or be substantially similar in function to the snapshot requester 404. As described above, in certain embodiments, the VM module 304 may emulate or virtualize an operating system of the snapshot service framework 402 or the like in order to permit the remote requester 412 to execute on the storage appliance 408 and to initiate snapshot procedures of the snapshot service framework 402. In one embodiment, the system 400 may comprise the remote requester 412 in place of the snapshot requester 404. In a further embodiment, the system 400 may include both the remote requester 412 and the snapshot requester 404, and the remote requester 412 may command or otherwise signal the snapshot requester 404 to initiate a snapshot procedure. In other embodiments, the system 400 may include a snapshot requester 404 without a remote requester 412.

Figure 5:
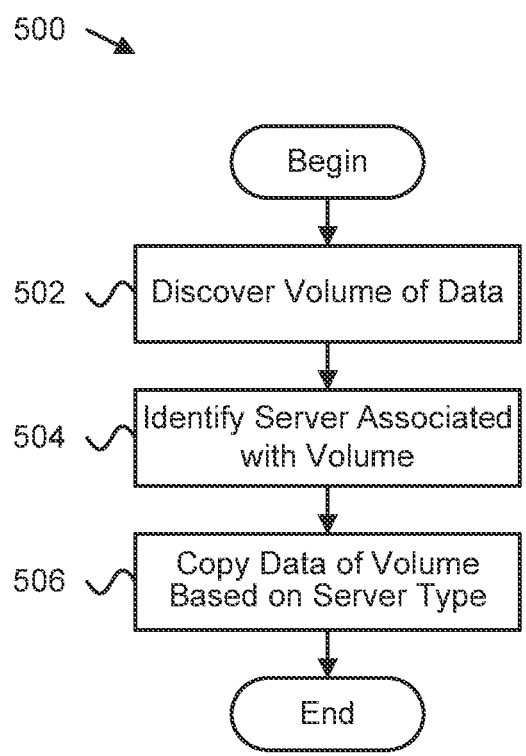
FIG. 5 is a schematic flow chart diagram illustrating one embodiment of a method for creating an application-aware snapshot.

FIG. 5 depicts a method 500 for creating application-aware snapshots. In one embodiment, the method 500 begins and the network association module 202 discovers 502 a volume 16 of data communicatively coupled to a storage appliance 10, 48, 408. In certain embodiments, a volume 16 of data comprises a non-volatile storage volume 16 or a set of data stored on a computer readable storage medium. In a further embodiment, the network association module 202 identifies 504 a server associated with the volume 16 of data. In certain embodiments, the server supports the volume 16 of data. In some embodiments, the server includes an operating system, a hypervisor, a DBMS, or another manager 18 that owns and/or manages the volume 16 of data. In certain embodiments, the server comprises a server type of a plurality of supported server types. In a further embodiment, the provider module 206 copies 506 data of the volume 16 of data based on the server type, using a snapshot operation adapted to the server type or the like. In certain embodiments, copying 506 the data includes a requester module 204 initiating the copying 506 using commands or services of the identified 504 server or manager 18. In some embodiments, copying 506 the data comprises one or more of creating a snapshot of the data of the volume 16 and creating a remote copy of the data of the volume 16. The method 500 ends.

Figure 6:
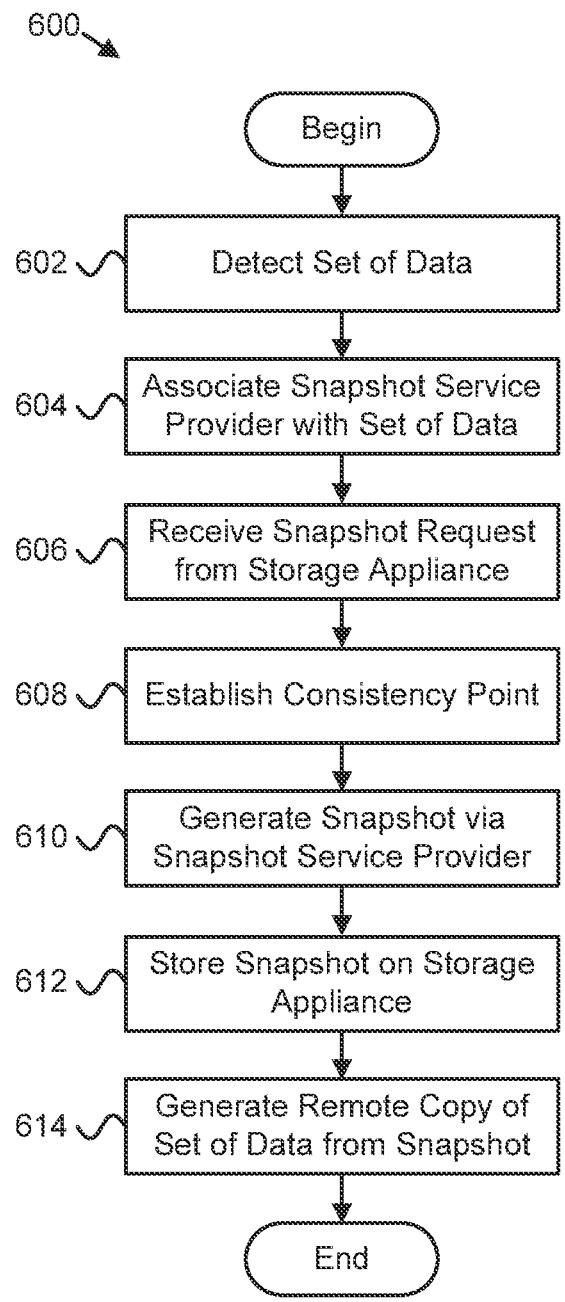
FIG. 6 is a schematic flow chart diagram illustrating another embodiment of a method for creating an application-aware snapshot.

FIG. 6 depicts a method 600 for creating application-aware snapshots. In one embodiment, the method 600 begins and the network association module 202 detects 602 a set of data. In some embodiments, the set of data comprises a storage volume 16, data stored on one or more computer readable storage media, or the like. In certain embodiments, detecting 602 the set of data includes obtaining an identifier associated with the set of data. In a further embodiment, the network association module 202 associates 604 a snapshot service provider (e.g., an owner, manager 18, server, and/or application) with the set of data. In certain embodiments, the snapshot service provider is provided by an operating system, a hypervisor, a DBMS, or a server associated with the set of data. For example, if the set of data is owned or managed by a Windows® operating system, then the snapshot service provider may be a Volume Shadow Copy Service (VSS). As another example, if the set of data is associated with a VMware® hypervisor or virtualization server, then the identified snapshot service provider may be a VMware® hypervisor or virtualization server. In certain embodiments, the network association module 202 associates 604 a snapshot service provider with the set of data based on the identifier associated with the set of data.

In one embodiment, a requester module 204 receives 606 a snapshot request from the storage appliance 10, 48, 408 (e.g., from a requester module 204, 404, 412) executing on the storage appliance 10, 48, 408), based on a schedule, a protection plan, and/or in response to another trigger. In certain embodiments, the requester module 204 initiates a snapshot operation in response to receiving 606 the request. For example, the requester module 204 may initiate a VSS session in response to receiving 606 the snapshot request. In a further embodiment, the requester module 204 establishes 608 a consistency point for one or more applications using the set of data (e.g., applications writing to and/or reading from the set of data). In certain embodiments, the requester module 204 establishes 608 the consistency point by issuing a quiescing command to the one or more applications. The quiescing command may be based on the associated 604 snapshot service provider. For example, upon initiating the VSS session, the requester module 204 may quiesce one or more VSS writers associated with the set of data.

In one embodiment, a provider module 206 generates 610 a snapshot via the associated 604 snapshot service provider. In a further embodiment, the provider module 206 stores 612 the snapshot on the storage appliance 10, 48, 408. The stored 612 snapshot may be used to restore applications to the consistency point in response to corruption of the set of data, failure of hardware supporting the set of data, an improper shutdown, or the like. In certain embodiments, the provider module 206 generates 614 a remote copy of the set of data based on the snapshot. The remote copy may be stored in a computer storage medium apart from the storage appliance 10, 48, 408 and may be used to restore the set of data. In certain embodiments, the provider module 206 generates 614 the remote copy automatically in response to generating 610 the snapshot, in response to a request for the remote copy from the requester module 204 over a custom interface, such as a private API between the requester module 204 and the provider module 206 or the like. The method 600 ends.

Figure 7:
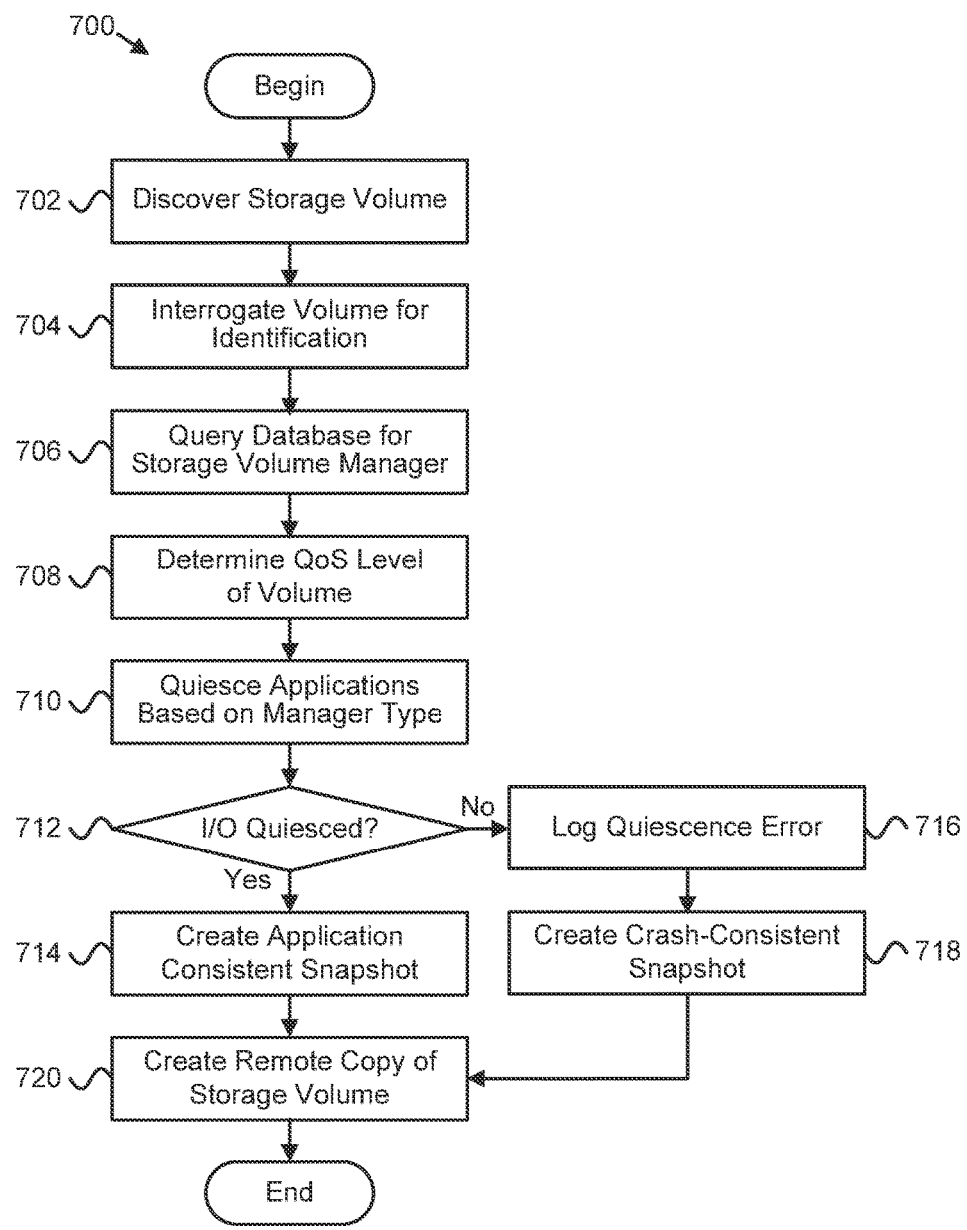
FIG. 7 is a schematic flow chart diagram illustrating a further embodiment of a method for creating an application-aware snapshot.

FIG. 7 depicts a method 700 for creating application-aware snapshots. In one embodiment, the method 700 begins and the network association module 202 discovers 702 a storage volume 16. In some embodiments, the storage volume 16 comprises a non-volatile storage volume 16. In certain embodiments, the storage volume 16 is located on a server comprising a computer readable storage medium. In a further embodiment, the network association module 202 interrogates 704 the storage volume 16 to obtain a storage volume identification (e.g., a volume identifier) for the storage volume 16. In certain embodiments, the storage volume identifier includes a storage volume name, a network address, a hardware identifier, and/or a globally unique identifier (GUID).

In a further embodiment, the network association module 202 queries 706 a database to correlate or match a manager 18 with the storage volume 16. In certain embodiments, the manager 18 is an operating system, a hypervisor, a DBMS, or a server supporting the storage volume 16. In some embodiments, the manager 18 comprises a manager type of a plurality of supported manager types. For example, the storage volume manager 18 may be a Windows® operating system owning or managing the storage volume 16. As another example, the storage volume 16 may be owned or managed by a virtual machine and the manager 18 may be a VMware® hypervisor and/or virtualization server. In certain embodiments, the network association module 202 determines 708 a QoS level associated with the storage volume 16. In some embodiments, the QoS level is determined based on the identifier associated with the storage volume 16. For example, the database used to identify the storage volume manager 18 may also be used to determine the QoS level for the storage volume 16, or the like.

In one embodiment, a requester module 204 quiesces 710, based on the manager type, one or more applications using the storage volume 16. In certain embodiments, the requester module 204 quiesces 710 the applications in response to a snapshot request from the storage appliance 10, 48, 408. For example, the requester module 204 may quiesce 710 the applications as a part of initiating a snapshot operation, said initiating occurring in response to the snapshot request. For example, upon initiating the VSS session, the requester module 204 may quiesce 710 one or more VSS writers associated with the storage volume 16. In certain embodiments, the requester module 204 uses commands or services available through the manager 18 to quiesce 710 the applications. For example, if the identified manager is a VMware® hypervisor and/or virtualization server, the requester module 204 may issue quiescing commands through the hypervisor and/or virtualization server. In certain embodiments, the requester module 204 establishes a consistency point for the applications by quiescing 710 one or more applications.

In a further embodiment, the requester module 204 determines 712 whether input/output activity for the storage volume 16 is quiesced. In certain embodiments, the requester module 204 monitors input/output activity on the storage volume 16 to determine 712 whether the input/output activity has been successfully quiesced. In some embodiments, the requester module 204 receives status reports from one or more snapshot writer applications indicating a quiescent state for the applications. If the requester module 204 determines that an input/output quiescent state is reached, the provider module 206 may then create 714 an application-consistent snapshot. Otherwise, if the requester module 204 determines that an input/output quiescent state is not reached, the requester module 204 may log 716 a quiescence error.

In one embodiment, the provider module 206 generates 714 the application-consistent snapshot via the storage volume manager 18. For example, the provider module 206 may act as a VSS provider to create the application-consistent snapshot using a VSS session. In certain embodiments, the provider module 206 stores the application-consistent snapshot on the storage appliance 10, 48, 408. The application-consistent snapshot may be used to restore applications to the consistency point in response to corruption of the storage volume 16 or failure of hardware supporting the storage volume 16. As used herein, an application-consistent snapshot is a snapshot where the application using a storage volume 16 has established a consistency point prior (e.g., substantially immediately prior) to creation of the snapshot. An application may rely on the application-consistent snapshot to recover itself after failure. An application-consistent snapshot speeds up the recovery process as the application does not need to reconcile input/output activity logs when recovering from a failure. In contrast, a crash-consistent snapshot is a snapshot where a consistency point was not established for the application prior to the creation of the snapshot. When recovering from failure using the crash-consistent snapshot, in certain embodiments, the application must review and reconcile its input/output activity logs—a time consuming process.

In one embodiment, the provider module 206 generates 718 a crash-consistent snapshot in response to determining 712 a failure to quiesce applications using the storage volume 16. When creating the crash-consistent snapshot, there may be some likelihood that the non-quiesced application is in the middle of an input/output operation at the time the snapshot is created. In certain embodiments, the provider module 206 stores the crash-consistent snapshot on the storage appliance 10, 48, 408. The crash-consistent snapshot may be used to restore applications after corruption of the storage volume 16 or failure of hardware supporting the storage volume 16. However, in certain embodiments, a recovery process may be longer and/or less accurate (e.g., data may be lost) when using a crash-consistent snapshot than an application-consistent or application-aware snapshot. It should be appreciated that a crash-consistent snapshot is likely to have a lower quality than an application-consistent snapshot. As such, a retention policy may retain an earlier-in-time application-consistent snapshot relative to a crash consistent snapshot.

In one embodiment, the provider module 206 creates 720 a remote copy of the storage volume 16 based on the snapshot (either the application-consistent or the crash-consistent snapshot). The remote copy may be stored in a computer storage medium apart from the storage appliance 10, 48, 408 and may be used to restore the storage volume 16. In certain embodiments, the remote copy is automatically created 720 in response to creating 714, 718 the snapshot. In some embodiments, the remote copy is created 720 using a custom interface, such as a private API. The method 700 ends.

In one embodiment of a primary data storage system, such as system 28, there is a preference for performing an application-consistent snapshot relative to a crash-consistent snapshot. However, a primary data storage system also is constrained to be substantially constantly available for use by the users of the system. Consequently, the ability of a primary data storage system to perform an application-consistent snapshot is subject to a time constraint (typically defined by a storage administrator via the storage administrator computer 34). More specifically, if the storage volume can be quiesced, a snapshot of the volume performed, and the volume can be unquiesced within the relevant time frame, an application-consistent snapshot is performed. If all of these operations cannot be performed within the time frame, a crash-consistent snapshot is performed. An application-consistent snapshot will be accorded a higher quality relative to a crash-consistent snapshot that is performed in lieu of an application-consistent snapshot as a result of insufficient time to perform an application-consistent snapshot. If a retention policy is implemented, an application-snapshot with a higher quality may be retained relative to a crash-consistent snapshot, i.e., the crash-consistent snapshot may be deleted in favor of the application-consistent snapshot.

A means for associating a manager 18 with a set of data, in various embodiments, may include a data protection module 150, a network association module 202, a discovery module 308, a device driver, a processor, a storage appliance 10, a source device 14, other logic hardware, and/or other executable code stored on a computer readable storage medium. Other embodiments may include similar or equivalent means for associating a manager with a set of data.

A means for creating a snapshot of the set of data, in various embodiments, may include a data protection module 150, a requester module 204, a provider module 206, a VM module 304, a device driver, a processor, a storage appliance 10, a source device 14, other logic hardware, and/or other executable code stored on a computer readable storage medium. Other embodiments may include similar or equivalent means for creating a snapshot of the set of data.

A means for creating a remote copy of the snapshot of the set of data, in various embodiments, may include a data protection module 150, a provider module 206, a remote copy module 302, a device driver, a processor, a storage appliance 10, a source device 14, other logic hardware, and/or other executable code stored on a computer readable storage medium. Other embodiments may include similar or equivalent means for creating a remote copy of the snapshot of the set of data.

A means for automatically creating a remote copy of the set of data, in various embodiments, may include a data protection module 150, a provider module 206, a remote copy module 302, a device driver, a processor, a storage appliance 10, a source device 14, other logic hardware, and/or other executable code stored on a computer readable storage medium. Other embodiments may include similar or equivalent means for automatically creating a remote copy of the set of data.

A means for establishing a consistency point for the set of data, in various embodiments, may include a data protection module 150, a requester module 204, a VM module 304, a input/output activity module 306, a device driver, a processor, a storage appliance 10, a source device 14, other logic hardware, and/or other executable code stored on a computer readable storage medium. Other embodiments may include similar or equivalent means for establishing a consistency point for the set of data.

A means for detecting applications associated with the set of data, in various embodiments, may include a data protection module 150, a network association module 202, a input/output activity module 306, a device driver, a processor, a storage appliance 10, a source device 14, other logic hardware, and/or other executable code stored on a computer readable storage medium. Other embodiments may include similar or equivalent means for detecting applications associated with the set of data.

A means for quiescing the applications associated with the set of data, in various embodiments, may include a data protection module 150, a requester module 204, a VM module 304, a input/output activity module 306, a device driver, a processor, a storage appliance 10, a source device 14, other logic hardware, and/or other executable code stored on a computer readable storage medium. Other embodiments may include similar or equivalent means for quiescing the applications associated with the set of data.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A primary data storage system with snapshot capability, the system comprising:
an input/output port configured to receive a block command packet that embodies one of a read block command and a write block command and transmitting a block result packet in reply to a block command packet;
a data store system having at least one data store configured to receive and store data in response to a write block command and retrieve and provide data in response to a read block command;
wherein the data store system is adaptable to accommodating at least a first storage element;
a data protection module that is adapted to: (a) identify the first storage element of the data store system, (b) identify a manager of the first storage element and the manager type of the of the identified manager, (c) associate the identified manager and manager type of the identified manager with the first storage element, and (d) initiate an application-consistent snapshot of the first storage element that is in accordance with the manager and manager type, wherein any resulting application-consistent snapshot includes metadata that relates to the relative quality of the snapshot;
wherein the data protection module is adaptable to producing a plurality of snapshots of the first storage element and associating a snapshot quality with each of the plurality of snapshots;
wherein the data protection module comprises a retention module for deleting at least one snapshot of the plurality of snapshots and retaining at least one of the plurality of snapshots based upon the relative snapshots qualities of the plurality of snapshots.

2. A primary data storage system, as claimed in claim 1, wherein:
the metadata of each snapshot of the plurality of snapshots has metadata relating to a quality of service goal for the first storage element.

3. A primary data storage system, as claimed in claim 1, wherein:
the metadata comprises metadata relating to the physical environment within which the storage element is located.

4. A primary data storage system, as claimed in claim 3, wherein:
the metadata relating to the physical environment comprises metadata relating to an initiator.

5. A primary data storage system with snapshot capability, the system comprising:
an input/output port configured to receive a block command packet that embodies one of a read block command and a write block command and transmitting a block result packet in reply to a block command packet;
a data store system having at least one data store configured to receive and store data in response to a write block command and retrieve and provide data in response to a read block command;
wherein the data store system is adaptable to accommodating at least a first storage element;
a data protection module that is adapted to: (a) identify the first storage element of the data store system, (b) identify a manager of the first storage element and the manager type of the of the identified manager, (c) associate the identified manager and manager type of the identified manager with the first storage element, and (d) initiate an application-consistent snapshot of the first storage element that is in accordance with the manager and manager type, wherein any resulting application-consistent snapshot includes metadata that relates to the relative quality of the snapshot;
wherein the data protection module is adaptable to producing a plurality of snapshots of the first storage element and associating a snapshot quality with each of the plurality of snapshots;
wherein the data protection modules comprises a restoration module for restoring the first storage element using one snapshot of the plurality of snapshots of the first storage element, wherein the restoration module uses the snapshot quality associated with each of the plurality of snapshots to determine which one of the plurality of snapshots to use in restoring the first storage element.

6. A primary data storage system, as claimed in claim 5, wherein:
the restoration module uses a quality-of-service goal in determining a destination for the first storage element.

7. A primary data storage system, as claimed in claim 5, wherein:
the metadata comprises metadata relating to the application environment of the storage element.

8. A primary data storage system, as claimed in claim 7, wherein:
the metadata relating to the application environment comprises metadata relating to the operating system type.

9. A primary data storage system with snapshot capability, the system comprising:
an input/output port configured to receive a block command packet that embodies one of a read block command and a write block command and transmitting a block result packet in reply to a block command packet;
a data store system having at least one data store configured to receive and store data in response to a write block command and retrieve and provide data in response to a read block command;
wherein the data store system is adaptable to accommodating at least a first storage element;
a data protection module that is adapted to: (a) identify the first storage element of the data store system, (b) identify a manager of the first storage element and the manager type of the of the identified manager, (c) associate the identified manager and manager type of the identified manager with the first storage element, and (d) initiate an application-consistent snapshot of the first storage element that is in accordance with the manager and manager type, wherein any resulting application-consistent snapshot includes metadata that relates to the relative quality of the snapshot;
wherein the data protection module is adaptable to producing a plurality of snapshots of the first storage element;
wherein the metadata of each snapshot of the plurality of snapshots has metadata relating to a quality of service goal for the first storage element;
wherein the data protection modules comprises a retention module for deleting at least one snapshot of the plurality of snapshots and retaining at least one of the plurality of snapshots based upon the metadata relating to the quality of service goal in each of the snapshots for the first storage element.

10. A primary data storage system with snapshot capability, the system comprising:
- an input/output port configured to receive a block command packet that embodies one of a read block command and a write block command and transmitting a block result packet in reply to a block command packet;
- a data store system having at least one data store configured to receive and store data in response to a write block command and retrieve and provide data in response to a read block command;
- wherein the data store system is adaptable to accommodating at least a first storage element;
- a data protection module that is adapted to: (a) identify the first storage element of the data store system, (b) identify a manager of the first storage element and the manager type of the of the identified manager, (c) associate the identified manager and manager type of the identified manager with the first storage element, and (d) initiate an application-consistent snapshot of the first storage element that is in accordance with the manager and manager type, wherein any resulting application-consistent snapshot includes metadata that relates to the relative quality of the snapshot;
- wherein the data protection modules comprises a restoration module for restoring the first storage element, wherein the restoration module uses a quality-of-service goal in determining a priority of the restoration of the first storage element relative to other operations.

11. A primary data storage system, as claimed in claim 10, wherein:
- the priority is one of a temporal priority and a bandwidth priority.

12. A primary data storage system with snapshot capability, the system comprising:
- an input/output port configured to receive a block command packet that embodies one of a read block command and a write block command and transmitting a block result packet in reply to a block command packet;
- a data store system having at least one data store configured to receive and store data in response to a write block command and retrieve and provide data in response to a read block command;
- wherein the data store system is adaptable to accommodating at least a first storage element;
- a data protection module that is adapted to: (a) identify the first storage element of the data store system, (b) identify a manager of the first storage element and the manager type of the of the identified manager, (c) associate the identified manager and manager type of the identified manager with the first storage element, and (d) initiate an application-consistent snapshot of the first storage element that is in accordance with the manager and manager type, wherein any resulting application-consistent snapshot includes metadata that relates to the relative quality of the snapshot;
- wherein the data protection modules is further adapted to initiate a crash-consistent snapshot when the operations associated with a previously initiated application-consistent snapshot cannot be completed within a specified time period.

13. A primary data storage system, as claimed in claim 12, wherein:
- the specified time period is based on a quality-of-service goal.

14. A primary data storage system with snapshot capability, the system comprising:
- an input/output port configured to receive a block command packet that embodies one of a read block command and a write block command and transmitting a block result packet in reply to a block command packet;
- a data store system having at least one data store configured to receive and store data in response to a write block command and retrieve and provide data in response to a read block command;
- wherein the data store system is adaptable to accommodating at least a first storage element and a second storage element;
- a data protection module that is adapted to: (a) identify the first and second storage elements of the data store system, (b) identify the manager of each of the first and second storage elements and the manager type of each of the identified managers, (c) associate an identified manager and manager type with each of the first and second storage elements, and (d) initiate an application-consistent snapshot of the first storage element that is in accordance with the manager and manager type of the first storage element and an application-consistent snapshot of the second storage element that is in accordance with the manager and manager type of the second storage element, wherein any resulting application-consistent snapshot includes metadata that relates to the relative quality of the snapshot;
- the first storage element is a first volume and the second storage element is a second volume;
- the data protection module is adaptable to producing a first snapshot of the first storage element with a first snapshot quality and a second snapshot of the second storage element with a second snapshot quality;
- wherein the data protection module comprises a retention module for deleting one of the first and second snapshots and retaining the other of the first and second snapshots based upon any difference in the first snapshot quality of the first snapshot and the second snapshot quality of the second snapshot.

15. A primary data storage system, as claimed in claim 14, wherein:
- the first storage element is a first sub-volume of a volume and the second storage element is a second sub-volume of one of: (a) the volume and (b) another volume;
- the data protection module is adaptable to producing a first snapshot of the first storage element with a first snapshot quality and a second snapshot of the second storage element with a second snapshot quality.

16. A primary data storage system with snapshot capability, the system comprising:
- an input/output port configured to receive a block command packet that embodies one of a read block command and a write block command and transmitting a block result packet in reply to a block command packet;
- a data store system having at least one data store configured to receive and store data in response to a write block command and retrieve and provide data in response to a read block command;
- wherein the data store system is adaptable to accommodating at least a first storage element and a second storage element;
- a data protection module that is adapted to: (a) identify the first and second storage elements of the data store system, (b) identify the manager of each of the first and second storage elements and the manager type of each of the identified managers, (c) associate an identified manager and manager type with each of the first and second storage elements, and (d) initiate an application-consistent snapshot of the first storage element that is in accordance with the manager and manager type of the first storage element and an application-consistent snapshot of the second storage element that is in accordance with the manager and manager type of the second storage element, wherein any resulting application-consistent snapshot includes metadata that relates to the relative quality of the snapshot;

the first storage element is a first volume and the second storage element is a second volume;

the data protection module is adaptable to producing a first snapshot of the first storage element with a first snapshot quality and a second snapshot of the second storage element with a second snapshot quality;

wherein the data protection modules comprises a retention module for deleting the first snapshot based upon a quality-of-service goal of the first storage element and retaining the second snapshot based upon a quality-of-service goal of the second storage element.

17. A primary data storage system, as claimed in claim 16, wherein:

the first storage element includes one of:
sub-volumes of the same volume,
sub-volumes of different volumes,
a volume and a sub-volume of a different volume,
a volume and a sub-volume of the same volume, and
different volumes;

the second storage element includes one of:
a sub-volume of a volume, and
a volume;

wherein the first storage element is different than the second storage element.

18. A primary data storage system with snapshot capability, the system comprising:

an input/output port configured to receive a block command packet that embodies one of a read block command and a write block command and transmitting a block result packet in reply to a block command packet;

a data store system having at least one data store configured to receive and store data in response to a write block command and retrieve and provide data in response to a read block command;

wherein the data store system is adaptable to accommodating at least a first storage element and a second storage element;

a data protection module that is adapted to: (a) identify the first and second storage elements of the data store system, (b) identify the manager of each of the first and second storage elements and the manager type of each of the identified managers, (c) associate an identified manager and manager type with each of the first and second storage elements, and (d) initiate an application-consistent snapshot of the first storage element that is in accordance with the manager and manager type of the first storage element and an application-consistent snapshot of the second storage element that is in accordance with the manager and manager type of the second storage element, wherein any resulting application-consistent snapshot includes metadata that relates to the relative quality of the snapshot;

the first storage element is a first volume and the second storage element is a second volume;

the data protection module is adaptable to producing a first snapshot of the first storage element with a first snapshot quality and a second snapshot of the second storage element with a second snapshot quality;

wherein the data protection modules comprises a restoration module for restoring the first storage element using the first snapshot and the second storage element using the second snapshot, wherein the priorities of the restorations of the first and second storage elements are based on quality-of-service goals associated with the first and second storage elements.

19. A primary data storage system, as claimed in claim 18, wherein:

the priorities are one of a temporal priorities and a bandwidth priorities.

20. A primary data storage system, with snapshot capability, the system comprising:

an input/output port configured to receive a block command packet that embodies one of a read block command and a write block command and transmitting a block result packet in reply to a block command packet;

a data store system having at least one data store configured to receive and store data in response to a write block command and retrieve and provide data in response to a read block command;

wherein the data store system is adaptable to accommodating at least a first storage element and a second storage element;

a data protection module that is adapted to: (a) identify the first and second storage elements of the data store system, (b) identify the manager of each of the first and second storage elements and the manager type of each of the identified managers, (c) associate an identified manager and manager type with each of the first and second storage elements, and (d) initiate an application-consistent snapshot of the first storage element that is in accordance with the manager and manager type of the first storage element and an application-consistent snapshot of the second storage element that is in accordance with the manager and manager type of the second storage element, wherein any resulting application-consistent snapshot includes meta data that relates to the relative quality of the snapshot;

wherein the first storage element is a first volume and the second storage element is a second volume;

the data protection module is adaptable to producing a first snapshot of the first storage element with a first snapshot quality and a second snapshot of the second storage element with a second snapshot quality; and wherein the data protection modules comprises a restoration module for restoring the first storage element using the first snapshot and the second storage element using the second snapshot, wherein the destinations of the restorations of the first and second storage elements are based on quality-of-service goals associated with the first and second storage elements.

21. A primary data storage system with snapshot capability, the system comprising:

an input/output port configured to receive a block command packet that embodies one of a read block command and a write block command and transmitting a block result packet in reply to a block command packet;

a data store system having at least one data store configured to receive and store data in response to a write block command and retrieve and provide data in response to a read block command;

wherein the data store system is adaptable to accommodating at least a first storage element and a second storage element;

a data protection module that is adapted to: (a) identify the first and second storage elements of the data store system, (b) identify the manager of each of the first and second storage elements and the manager type of each of the identified managers, (c) associate an identified manager and manager type with each of the first and second storage elements, and (d) initiate an application-consistent snapshot of the first storage element that is in accordance with the manager and manager type of the first storage element and an application-consistent snapshot of the second storage element that is in accordance with the manager and manager type of the second storage element, wherein any resulting application-consistent snapshot includes metadata that relates to the relative quality of the snapshot;

the first storage element is a first sub-volume of a volume and the second storage element is a second sub-volume of one of: (a) the volume and (b) another volume;

the data protection module is adaptable to producing a first snapshot of the first storage element with a first snapshot quality and a second snapshot of the second storage element with a second snapshot quality;

wherein the data protection module comprises a retention module for deleting one of the first and second snapshots and retaining the other of the first and second snapshots based upon and difference in the first snapshot quality of the first snapshot and the second snapshot quality of the second snapshot.

22. A primary data storage system, as claimed in claim 21, wherein:
the first storage element includes one of:
sub-volumes of the same volume,
sub-volumes of different volumes,
a volume and a sub-volume of a different volume,
a volume and a sub-volume of the same volume, and
different volumes;
the second storage element includes one of:
sub-volumes of the same volume,
sub-volumes of different volumes,
a volume and a sub-volume of a different volume,
a volume and a sub-volume of the same volume, and
different volumes;
wherein the first storage element is different than the second storage element.

23. A primary data storage system with snapshot capability, the system comprising:
an input/output port configured to receive a block command packet that embodies one of a read block command and a write block command and transmitting a block result packet in reply to a block command packet;
a data store system having at least one data store configured to receive and store data in response to a write block command and retrieve and provide data in response to a read block command;
wherein the data store system is adaptable to accommodating at least a first storage element and a second storage element;
a data protection module that is adapted to: (a) identify the first and second storage elements of the data store system, (b) identify the manager of each of the first and second storage elements and the manager type of each of the identified managers, (c) associate an identified manager and manager type with each of the first and second storage elements, and (d) initiate an application-consistent snapshot of the first storage element that is in accordance with the manager and manager type of the first storage element and an application-consistent snapshot of the second storage element that is in accordance with the manager and manager type of the second storage element, wherein any resulting application-consistent snapshot includes metadata that relates to the relative quality of the snapshot;

the first storage element is a first sub-volume of a volume and the second storage element is a second sub-volume of one of: (a) the volume and (b) another volume;

the data protection module is adaptable to producing a first snapshot of the first storage element with a first snapshot quality and a second snapshot of the second storage element with a second snapshot quality;

wherein the data protection modules comprises a retention module for deleting at least the first snapshot based upon a quality-of-service goal of the first storage element and retaining the second snapshot based upon a quality-of-service goal of the second storage element.

24. A primary data storage system, as claimed in claim 23, wherein:
a snapshot is one of: (a) a remote copy, and (b) a local copy.

25. A primary data storage system, as claimed in claim 24, wherein:
the one of a remote copy and a local copy is one of: (a) a full copy, (b) a differential copy, and (c) an incremental copy.

26. A primary data storage system with snapshot capability, the system comprising:
an input/output port configured to receive a block command packet that embodies one of a read block command and a write block command and transmitting a block result packet in reply to a block command packet;
a data store system having at least one data store configured to receive and store data in response to a write block command and retrieve and provide data in response to a read block command;
wherein the data store system is adaptable to accommodating at least a first storage element and a second storage element;
a data protection module that is adapted to: (a) identify the first and second storage elements of the data store system, (b) identify the manager of each of the first and second storage elements and the manager type of each of the identified managers, (c) associate an identified manager and manager type with each of the first and second storage elements, and (d) initiate an application-consistent snapshot of the first storage element that is in accordance with the manager and manager type of the first storage element and an application-consistent snapshot of the second storage element that is in accordance with the manager and manager type of the second storage element, wherein any resulting application-consistent snapshot includes metadata that relates to the relative quality of the snapshot;

the first storage element is a first sub-volume of a volume and the second storage element is a second sub-volume of one of: (a) the volume and (b) another volume;

the data protection module is adaptable to producing a first snapshot of the first storage element with a first snapshot quality and a second snapshot of the second storage element with a second snapshot quality;

wherein the data protection modules comprises a restoration module for restoring the first storage element using the first snapshot and the second storage element using the second snapshot, wherein the priorities of the restorations of the first and second storage elements are based on quality-of-service goals associated with the first and second storage elements.

27. A primary data storage system, as claimed in claim 26, wherein:
the priorities are one of a temporal priorities and a bandwidth priorities.

28. A primary data storage system with snapshot capability, the system comprising:
an input/output port configured to receive a block command packet that embodies one of a read block command and a write block command and transmitting a block result packet in reply to a block command packet;
a data store system having at least one data store configured to receive and store data in response to a write block command and retrieve and provide data in response to a read block command;
wherein the data store system is adaptable to accommodating at least a first storage element and a second storage element;
a data protection module that is adapted to: (a) identify the first and second storage elements of the data store system, (b) identify the manager of each of the first and second storage elements and the manager type of each of the identified managers, (c) associate an identified manager and manager type with each of the first and second storage elements, and (d) initiate an application-consistent snapshot of the first storage element that is in accordance with the manager and manager type of the first storage element and an application-consistent snapshot of the second storage element that is in accordance with the manager and manager type of the second storage element, wherein any resulting application-consistent snapshot includes metadata that relates to the relative quality of the snapshot;
the first storage element is a first sub-volume of a volume and the second storage element is a second sub-volume of one of: (a) the volume and (b) another volume;
the data protection module is adaptable to producing a first snapshot of the first storage element with a first snapshot quality and a second snapshot of the second storage element with a second snapshot quality;
wherein the data protection modules comprises a restoration module for restoring the first storage element using the first snapshot and the second storage element using the second snapshot, wherein the destinations of the restorations of the first and second storage elements are based on quality-of-service goals associated with the first and second storage elements.

29. A primary data storage system, as claimed in claim 28, further comprising:
a quality of service module that schedules one or more actions for one or both of the first and second storage elements.

30. A primary data storage system, as claimed in claim 29, wherein:
the one or more actions include: (a) a snapshot, (b) a copy, (c) a retention, and (d) a deletion.

31. A primary data storage system, as claimed in claim 29, wherein:
a schedule is configured based on one or more of the following: (a) user input (b) quality of service goal, (c) protection plan, and (d) requester module.

32. A primary data storage system with snapshot capability, the system comprising:
an input/output port configured to receive a block command packet that embodies one of a read block command and a write block command and transmitting a block result packet in reply to a block command packet;
a data store system having at least one data store configured to receive and store data in response to a write block command and retrieve and provide data in response to a read block command;
wherein the data store system is adaptable to accommodating at least a first storage element and a second storage element;
a data protection module that is adapted to: (a) identify the first and second storage elements of the data store system, (b) identify the manager of each of the first and second storage elements and the manager type of each of the identified managers, (c) associate an identified manager and manager type with each of the first and second storage elements, and (d) initiate an application-consistent snapshot of the first storage element that is in accordance with the manager and manager type of the first storage element and an application-consistent snapshot of the second storage element that is in accordance with the manager and manager type of the second storage element, wherein any resulting application-consistent snapshot includes metadata that relates to the relative quality of the snapshot;
wherein the data protection module is further adapted to initiate a crash-consistent snapshot when the operations associated with a previously initiated application-consistent snapshot cannot be completed within a specified time period.

33. A primary data storage system, as claimed in claim 32, wherein:
the specified time period is based on a quality-of-service goal.

* * * * *